US012645711B2

(12) United States Patent
Kargieman et al.

(10) Patent No.: US 12,645,711 B2
(45) Date of Patent: Jun. 2, 2026

(54) DYNAMIC ORDER AND RESOURCE MANAGEMENT METHOD AND SYSTEM FOR GEOSPATIAL INFORMATION PROVISION

(71) Applicant: Urugus S.A., Montevideo (UY)

(72) Inventors: Emiliano Kargieman, Barcelona (ES); Victor Pajuelo Madrigal, Barcelona (ES); Montserrat Vega Jiménez, Barcelona (ES); Gerardo Gabriel Richarte, Barcelona (ES)

(73) Assignee: Urugus S.A., Montevideo (UY)

( * ) Notice: Subject to any disclaimer, the term of this patent is extended or adjusted under 35 U.S.C. 154(b) by 0 days.

(21) Appl. No.: 18/710,548

(22) PCT Filed: Nov. 14, 2022

(86) PCT No.: PCT/US2022/049775
§ 371 (c)(1),
(2) Date: May 15, 2024

(87) PCT Pub. No.: WO2023/086613
PCT Pub. Date: May 19, 2023

(65) Prior Publication Data
US 2025/0036664 A1     Jan. 30, 2025

Related U.S. Application Data

(60) Provisional application No. 63/279,450, filed on Nov. 15, 2021.

(30) Foreign Application Priority Data

Aug. 25, 2022    (ES) ................................. P202230767

(51) Int. Cl.
*G06F 16/29*        (2019.01)
*G06Q 30/0201*      (2023.01)

(52) U.S. Cl.
CPC ......... *G06F 16/29* (2019.01); *G06Q 30/0206* (2013.01)

(58) Field of Classification Search
CPC ...... G06F 16/29; G06F 16/248; G06F 16/738; G06Q 30/0206; G06Q 30/02
(Continued)

(56) References Cited

U.S. PATENT DOCUMENTS 10,322,801 B1 *  6/2019  Yeturu ................... G06V 20/17
11,120,263 B1    9/2021  Lee
(Continued)

FOREIGN PATENT DOCUMENTS

EP           3077986 B1     5/2020
ES           2948840 A1 *  9/2023   ......... G06F 16/5866
WO      WO2015130365 A2     9/2015

OTHER PUBLICATIONS

Spanish Search Report mailed on May 5, 2023 for Spanish Application No. 202230767, 10 pages.
(Continued)

*Primary Examiner* — Md I Uddin
(74) *Attorney, Agent, or Firm* — Lee & Hayes, P.C.

(57) ABSTRACT

Systems, methods and devices to manage user orders for geospatial information and to perform an optimization scheme for satellite resources within a satellite constellation are provided. Embodiments include computer-implemented methods comprising receiving, from a user, an order for geospatial information, wherein the order comprises at least one attribute related to the ordered geospatial information; and querying a database to identify information about other orders received from the same or different users, with the same or different attributes; and at least one of: setting a price for the geospatial information ordered by the user based at least in part on the at least one attribute and the
(Continued)

identified other orders, or performing an optimization scheme for determining whether the ordered geospatial information can be provided to the user and the other user orders can be satisfied, and targeting at least one sensor on board a manned or unmanned aerial vehicle configured to collect the geospatial information based on the determination.

18 Claims, 7 Drawing Sheets

(58) Field of Classification Search
USPC ....... 707/688, 724, 737, 769, 770, 802, 705, 707/727, 736, 749, E17.044, E17.014, 707/999.002, 999.003, 999.107
See application file for complete search history.

(56) References Cited

U.S. PATENT DOCUMENTS

| | | | |
|---|---|---|---|
| 2008/0140625 A1 | 6/2008 | Chang et al. | |
| 2011/0199376 A1* | 8/2011 | Salemann | G06T 17/05 |
| | | | 345/424 |
| 2017/0150060 A1 | 5/2017 | Herz | |
| 2017/0250751 A1 | 8/2017 | Kargieman et al. | |
| 2018/0322197 A1 | 11/2018 | Hesterman | |
| 2020/0004272 A1 | 1/2020 | Pilskalns | |
| 2022/0351601 A1* | 11/2022 | Bracey | G08B 21/22 |

OTHER PUBLICATIONS

PCT Search Report and Written Opinion mailed Feb. 23, 2023 for PCT application No. PCT/US2022/049775, 15 pages.

* cited by examiner

DYNAMIC ORDER AND RESOURCE MANAGEMENT METHOD AND SYSTEM FOR GEOSPATIAL INFORMATION PROVISION

CROSS REFERENCE TO RELATED APPLICATIONS

The present application is a US national stage entry of International Patent Application No. PCT/US22/49775, filed on Nov. 14, 2022, which claims priority to U.S. Provisional Application No. 63/279,450, filed Nov. 15, 2021, entitled "Dynamic order and resource management method and system for geospatial information provision", and to the Spanish Patent Application No. 202230767, filed Aug. 25, 2022, entitled "Método y sistema de gestión dinámica de recursos y solicitudes para aprovisionamiento de información geoespacial", the entire contents of which are incorporated herein in their entirety by reference.

TECHNICAL FIELD

The present disclosure relates to the technical field of geospatial information, more specifically to methods and systems for managing satellite system resources and user orders requesting geospatial information, including, but not limited to imagery data, radar data, radiofrequency data, gas detection data, or any type of data that may be derived from these.

BACKGROUND

One of the many functions of satellites or other celestial body orbiting vehicles is data collection, such as planet-related satellite data collection, such as planet imagery (like Earth imagery). Satellite data may be collected for an area of interest on the Earth (or another planet or celestial body), and may afterwards be processed and provided to end users to be used for different purposes, such as for analyzing an area for different objectives, such as agricultural, geological, cartographical, meteorological, or some other useful purpose. However, orbiting satellites cannot simply move to a desired location to collect satellite data for a specific user. Orbit inclination is an important factor that determines whether a satellite will be orbiting the same path or visiting different paths as it revolves around the celestial body, such as the Earth. Satellites with an orbit inclination of 0° rotate over the equator all the time without going over any other location. Satellites with an orbit inclination of 45° go over areas of the northern and southern hemisphere of the Earth between 45° latitude. Satellites with orbit inclination 90° can fly over any part of the Earth. Typically, this is what most commercial Earth-observation satellites prefer as they need the capability to obtain data from any part of the Earth desired by the users. Having a constellation of multiple satellites allows to cover more areas of the Earth in less time. However, when having multiple orders or requests for satellite data or information derived from this data from users, a conflict can arise as not all the orders may be within the scope of the swath of the constellation of satellites at a certain moment. In such cases, there may be a high cost in resources to steer the satellites of the constellation so as to satisfy all the requests or orders, and it may even not be possible to steer or reorient the satellites of the constellation to capture the requested data in time at the different places. In addition, multiple orders may have different requirements, and therefore providing the same data to users who will make a different use of the data may result in providing users with unnecessary data. Moreover, when placing orders for satellite data, users are usually not given information about how the price for the satellite data is determined, and requesting satellite data can be a information about how the price for the satellite data is determined, and requesting satellite data can be a cumbersome and lengthy task, which does not allow them to receive data which adjusts to their needs and constraints.

In view of the above, and in order to achieve a compromise between satisfying user orders for satellite data at certain times and with certain requirements, and operating within the capacity limits of the satellite system resources, there is a need for a mechanism that optimizes the satellite system resources and the management of the user orders, while being transparent and affordable for the users, in relation to what results they can expect and their associated costs.

SUMMARY

According to some embodiments, a computer-implemented method for managing user requests or orders for geospatial information is provided, comprising: receiving, from a user or a group of users, an order for geospatial information, wherein the order comprises at least one attribute related to the ordered geospatial information; and querying a database to identify information about other orders received from the same or different users, with the same or different attributes; and at least one of: setting a price for the geospatial information ordered by the user based at least in part on the at least one attribute and the identified other orders, or performing an optimization scheme for determining whether the ordered geospatial information can be provided to the user (and optionally whether the other user orders can be satisfied), and targeting at least one sensor on board a manned or unmanned aerial or space vehicle, such as a satellite or spacecraft, configured to collect data associated with the geospatial information based on the determination. Geospatial information includes any type of data collected or gathered by a sensor on the ground, on a mobile device, on a manned or unmanned aerial vehicle, or on board a satellite or spacecraft (also referred to as satellite data), and/or any data derived from said collected data and/or associated with a particular geographic location, or data manually created and associated with a particular geographical location. For example, geospatial information may include imagery data, radar data, lidar data, radiofrequency data, data related to gas or other substance detection, and the derived data may include an analysis or processing performed to the collected data, including analysis performed with algorithms such as artificial intelligence or machine learning algorithms. It should be understood that the same features and processes as described throughout the Detailed Description may be implemented in relation to aerial information (when the sensors are on board any manned or unmanned aerial vehicle such as drones, balloons or aircrafts), or information derived from sensor on board satellites or spacecrafts, without departing from the scope of embodiments. Providing the geospatial information to the user may comprise at least one of displaying the geospatial information, storing the geospatial information, loading the geospatial information into memory, transmitting the geospatial information over a communication network to a remote computing system, such as downloading the geospatial information from the manned or unmanned aerial or space vehicle to another location which may be on the ground or on board another vehicle, or any other suitable way of allowing the user to access the geospatial information.

A method according to embodiments of the present disclosure can dynamically determine the price for which geospatial information is to be provided to users, dynamically determine the feasibility for providing the geospatial information in view of available system resources, and/or dynamically re-target a sensor on board a manned or unmanned aerial vehicle, or a spacecraft or a satellite or satellite constellation, to optimize system resources. According to some embodiments, a user may send an order or request to a geospatial information delivery system, which may be a web-based system with a user interface through which the users can place their requests. In the request, the user may indicate at least one attribute that the requested geospatial information should have.

According to some embodiments, the geospatial information comprises information associated with or derived from at least one of imagery data, radar data, lidar data, radiofrequency data, and data related to gas or other substance detection.

According to some embodiments, the at least one attribute includes at least one of a starting date and end date of collecting the data, at least one specific area of interest and at least one target application for the geospatial information.

For example, the request may relate to geospatial information associated with data already collected in the past and stored in a database, to geospatial information associated with data collected with a starting date in the past and an end date in the future, or to geospatial information still entirely to be collected in the future. The start date of collection may be defined relative to the time when the order is placed, and may be any date, such as one day, week, or month from the date of placing the request, or one day, ten days, one month or six months before placing the request.

The area of the Earth where the geospatial information is to be collected may be given as a customized defined area delimited by coordinates, or as a predefined area in a gridded map, or an area such as a neighborhood, a city, a province, or the like, or even as a point on the map.

According to some embodiments, performing the optimization scheme comprises at least one of determining a path or schedule that the at least one sensor is to follow, determining whether the at least one sensor is to pass over the at least one specific area of interest, and determining if and how the at least one sensor needs to change a pointing direction.

According to some embodiments, the at least one target application includes at least one of a list comprising, but not limited to: analytics, agriculture, geology, cartography, meteorology, humanitarian purposes, or the like.

According to some embodiments, the at least one attribute may include at least one of a frequency of collection of the data associated with the geospatial information (such as once a week, once a month, once a day), a type of geospatial information, that is a type of product requested, an acceptable threshold level for cloud coverage in the collected data, and a maximum price for the geospatial information.

The type of geospatial information (type of product) may indicate whether the requested information should include images or sequence of images (video frames), information about levels of gas or other substance concentration, RF signals, radar data, lidar data, and so forth. For example, if the user requests imagery data, the type of geospatial information may refer to images of different resolution levels, images with different frequency spectrum content (multispectral images, hyperspectral images . . . ), sequences of images (videos), and the like.

According to some embodiments, setting the price for the geospatial information ordered by the user comprises performing a simulation of the operation of the sensor on board a manned or unmanned aerial or space vehicle, satellite or spacecraft, such as a constellation of satellites or a heterogeneous constellation comprising any combination of manned or unmanned aerial or space vehicles, satellites or spacecrafts, and determining the resources needed for steering, tasking or reprogramming the one or more vehicles of the constellation in order to collect the geospatial information requested by the user with the at least one attribute. This allows the system to calculate, in real time or near real time, the feasibility of fulfilling the user order, and how the system resources should be optimized for that, without having to actually retask the constellation.

According to some embodiments, the at least one attribute includes information about a type of content of interest in the geospatial information, wherein setting the price for the geospatial information is based at least in part on the type of content of interest.

According to some embodiments, the method further comprises, if the user accepts the set price, and/or if the determination indicates that the ordered geospatial information can be provided to the user, retrieving and/or computing the ordered geospatial information and providing the ordered geospatial information to the user.

According to some embodiments, providing the ordered geospatial information to the user comprises performing a content-based analysis in the collected data to determine whether the collected data comprises the type of content of interest, and providing the geospatial information that contains the type of content of interest.

According to some embodiments, providing the ordered geospatial information to the user comprises, if the order is for data associated with the geospatial information collected in the past, retrieving the data associated with the geospatial information from the database, based at least in part on identifying metadata associated with the data such that the at least one attribute of the order matches at least one attribute of the metadata, and providing the geospatial information to the user.

According to some embodiments, the at least one attribute further includes an indication to download the geospatial information, from the manned or unmanned aerial or space vehicle (with the at least one sensor that collected the data) only if the type of content of interest is present in the collected data, and wherein the method further comprises, after performing the content-based data analysis, autonomously determine, by the geospatial information delivery system, whether to download the geospatial information based on the presence of the type of content.

According to some embodiments, the content-based analysis in the collected data is based at least in part on the execution of a machine learning algorithm, (regular) machine vision algorithm, or artificial intelligence algorithm.

According to some embodiments, the at least one attribute includes information indicating that at least one algorithm selected by the geospatial information delivery system be used to process the geospatial information before providing the geospatial information to the user, and/or information selecting a specific algorithm to process the geospatial information. In some embodiments, the at least one algorithm is executed on board the manned or unmanned aerial or space vehicle (with the at least one sensor that collected the data).

According to some embodiments, the at least one manned or unmanned aerial or space vehicle (with the at least one sensor) autonomously determines whether to provide the geospatial information to the user based on the result of processing the geospatial information with the at least one algorithm.

According to some embodiments, the optimization scheme is performed in order to satisfy at least one order that requires the most cost-efficient use of resources and/or that provides a highest value.

According to some embodiments, the value is determined based at least in part on weight assigned to the at least one attribute of the user order.

According to some embodiments, performing the optimization scheme comprises at least one of determining a schedule that one or more sensors, such as satellites in a constellation, is to follow, determining at least one sensor that is to pass over the at least one specific area, point, space or feature of interest, or determining if and how at least one sensor of the at least one sensor needs to change a target direction.

Taking as input the at least one attribute of the request from the user, the geospatial information delivery system may execute an algorithm which may take into account this at least one attribute and also other attributes of other user requests. In some embodiments, the algorithm may determine whether the request is for geospatial information associated with data already collected in the past or geospatial information associated with data which still needs to be collected. If the geospatial information has a collection date in the past, the algorithm may retrieve the geospatial information from a database and assign a price according to at least one of the date in which the geospatial information was collected and the application, preferably according to at least one attribute and also other attributes of other user requests, the date in which the geospatial information was collected, and the application.

According to some embodiments, if the data associated with the geospatial information still needs to be collected, the algorithm may try to optimize the trade off between providing to all users the geospatial information fulfilling all the requested attributes, and managing the satellite constellation system to go and capture the required data. The algorithm may in addition try to solve conflicts arising from multiple conflicting requests which cannot be met. For example, when multiple requests for data are placed for different areas of interest, but to be captured at approximately the same moment, such that it is not possible to maneuver the satellite constellation to collect the data at the multiple locations at the required times, the algorithm may perform conflict resolution operations to use the scarce or limited satellite constellation resources in the most efficient way, and/or to maximize the value obtained by the geospatial information delivery system. Throughout the present disclosure, value is to be understood as level of importance or worth, and may be determined based at least in part on determined attribute(s) or quality of the geospatial information that gives it a certain importance or worth. The value may be associated with a mapper value that will be described elsewhere in this Detailed Description.

According to some embodiments, for setting the price for the geospatial information, a value is assigned to the at least one specific area and at least one specific application, wherein preferably the value is assigned based on the at least one attribute and the information about the other requests, such as by multiplying a series of parameters based on the at least one attribute and the information about other requests.

According to some embodiments, the database comprises a heatmap of the Earth, divided into tiles of the same or different dimensions, wherein each tile provides information about the other orders received from the same or different users, and/or information associated with geospatial information collected for an area corresponding to said each tile in the past.

According to some embodiments, each tile comprises at least one minimum deliverable unit, MDU, wherein the at least one MDU includes geospatial information and associated metadata, and wherein querying the database comprises accessing the at least one MDU.

According to some embodiments, each tile is associated with a mapper value, wherein for determining whether the ordered geospatial information can be provided to the user (and optionally whether the other user orders can be satisfied), the method comprises assigning or updating the mapper value of at least one tile (for example, of at least one tile corresponding to the at least one specific area based at least in part on the at least one specific area and at least one specific application), wherein preferably the mapper value is assigned or updated based at least in part on the at least one attribute and the information about the other orders. According to some embodiments, the value is associated with the mapper value.

According to some embodiments, the at least one attribute includes information about whether the user allows the system to perform a best effort to fulfill the order, or whether the user requires a guarantee that the order will be fulfilled, wherein if the user requires the guarantee that the order will be fulfilled, the method comprises fixing the order, thereby setting the price and/or targeting the at least one sensor so as to fulfill the order.

According to some embodiments, if the user wants the guarantee, the method further comprises performing an optimization operation to determine an operational cost and/or an expected value or revenue of fulfilling the user request while not fulfilling other requests. In some embodiments, setting the price and/or targeting the at least one sensor so as to fulfill the order is based on (such as comprises) performing an optimization operation to determine an operational cost of fulfilling the user order while not fulfilling other orders in areas different from the at least one specific area.

According to some embodiments, the method further comprises displaying, through a user interface or application programming interface, API, to the user, the set price and additional information, and after the user has accepted the price and additional information, providing the ordered geospatial information to the user.

According to some embodiments, the at least one sensor on board a manned or unmanned aerial or space vehicle corresponds to a satellite, and preferably the satellite corresponds to a constellation of a plurality of satellites configured to communicate with each other while in orbit and/or with at least one ground station.

According to some embodiments, a geospatial information delivery system is provided, comprising: at least one processor; and computer-readable media coupled to the at least one processor, the computer-readable media including one or more modules that are executable by the at least one processor to: receive, from a user, an order for geospatial information, wherein the order comprises at least one attribute related to the geospatial information; and query a database to identify information about other orders received from the same or different users, with the same or different attributes; and at least one of: set a price for the geospatial information ordered by the user based at least in part on the at least one attribute and the identified other orders, or perform an optimization scheme for determining whether the ordered geospatial information can be provided to the user (and optionally whether the other user orders can be satisfied), and target at least one sensor on board a manned or unmanned aerial or space vehicle (such as a satellite) configured to collect data associated with the geospatial information based on the determination.

According to some embodiments, the system further comprises the at least one sensor on board a manned or unmanned aerial or space vehicle (such as a satellite), wherein the at least one sensor on board a manned or unmanned aerial or space vehicle (such as a satellite) is further configured to transmit the geospatial information and/or the collected data associated with the geospatial information to the processor.

According to some embodiments, the processor is configured to perform any of the steps of the method shown above.

According to some embodiments, a computer-implemented method for managing user requests for geospatial information is provided, comprising: receiving, from a user, an order for geospatial information, wherein the request comprises at least one attribute related to the requested data; optionally retrieving the requested geospatial information; performing an analysis of the geospatial information to assign a classification of the type of data; and providing the geospatial information to the user with the assigned classification. The requested geospatial information may comprise data (e.g. imagery data) or analysis generated by analyzing the data (e.g. imagery data). For example, if the request for geospatial information comprises imagery data, the analysis may comprise performing a semantic analysis of the imagery data to assign a classification of the type of imagery data and providing the geospatial information to the user with the assigned classification. In some instances, the analysis may comprise performing a semantic classification and/or search to provide the geospatial information to the user with the assigned classification. In some embodiments, the classification includes information about at least one of a type of object or feature present in at least one captured image conforming the imagery data.

According to some embodiments, a computer-implemented method for managing user orders for satellite imagery data is provided, comprising: receiving, from a user, an order for satellite imagery data, wherein the order comprises at least one attribute related to the ordered satellite imagery data; retrieving satellite imagery data; performing a semantic analysis of the satellite imagery data to identify imagery data with at least one attribute corresponding to the at least one attribute; and providing the information related to the identified imagery data to the user.

According to some embodiments, the at least one attribute includes information about at least one of a type of object or feature present in at least one collected image conforming the satellite imagery data. In some embodiments, retrieving the satellite imagery data comprises querying a database where the satellite imagery data is stored. In some embodiments, retrieving the satellite imagery data comprises obtaining satellite imagery data collected by at least one satellite, and performing the semantic analysis of the collected satellite imagery data.

According to some embodiments, a geospatial information delivery system is provided, comprising: at least one processor and computer-readable media coupled to the at least one processor, the computer-readable media including one or more modules that are executable by the at least one processor to: receive, from a user, a request for geospatial information, wherein the request comprises at least one attribute related to the requested data; and query a database to identify information about other requests received from the same or different users, with the same or different attributes; and at least one of: set a price for the data requested by the user based at least in part on the at least one attribute and the identified other requests, or perform an optimization scheme for determining whether the requested data can be provided to the user and the other user requests can be satisfied, and task at least one satellite configured to collect the data based on the determination.

According to some embodiments, the system further comprises at least one orbiting satellite configured to transmit the collected geospatial information to the processor.

Further features and advantages, as well as the structure and operation of various embodiments are described in detail below, with reference to the accompanying drawings. It is noted that the invention is not limited to the specific embodiments described herein. Such embodiments are presented herein for illustrative purposes only. Additional embodiments will be apparent to persons skilled in the relevant art(s), based on the teachings contained herein.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION OF EMBODIMENTS

The methods, systems, and devices described herein may be implemented in a number of ways. Example implementations are provided below with reference to the following figures to aid in illustration, although those examples are not meant to be taken in a limiting sense.

Figure 1:
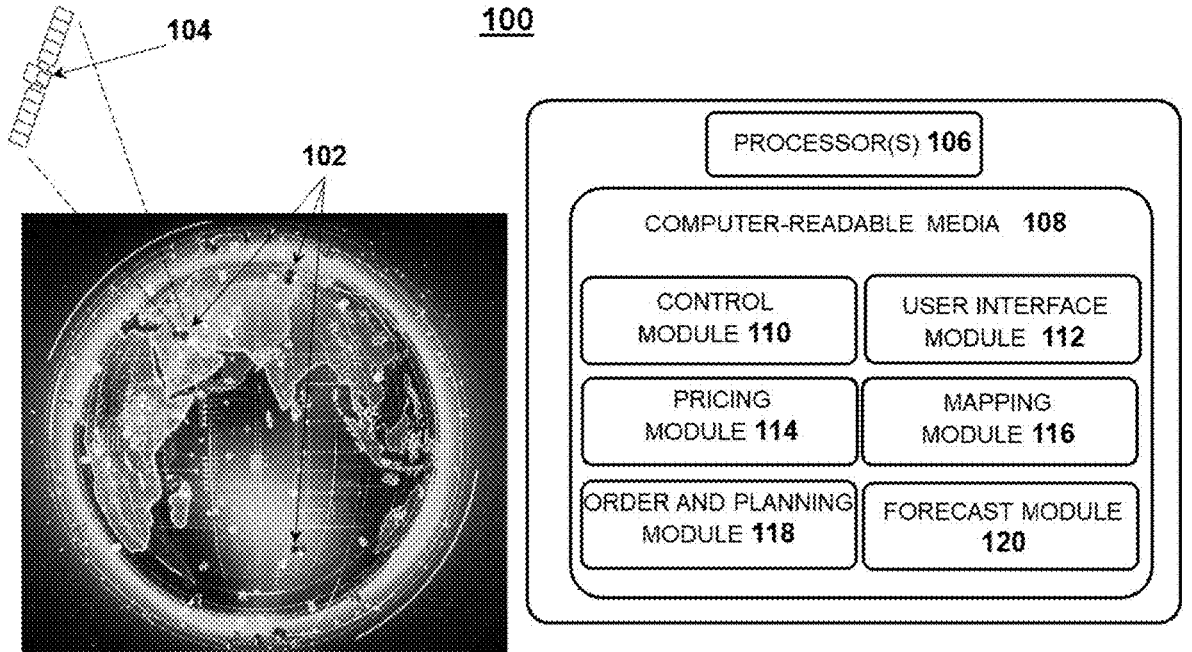
FIG. 1 shows an example of a geospatial information delivery system according to embodiments of the present disclosure.

FIG. 1 shows an example of a geospatial information delivery system according to embodiments of the present disclosure, such as a geospatial information delivery system. While the following example illustrates a geospatial information delivery system for satellite data, such as for example satellite imagery data, it should be understood that the scope also includes other types of data as disclosed throughout the Detailed Description. The geospatial information delivery system 100 may include one or more satellites 102. In some instances the one or more satellites 102 comprise a constellation of satellites orbiting the Earth as can be seen in FIG. 1. Although, for simplicity, the embodiment of FIG. 1 shows an example of satellites orbiting the Earth, it should be understood that other manned or unmanned vehicles orbiting other celestial bodies are also encompassed in the present disclosure. The constellation may include any suitable number of satellites, including at least one satellite, and the number shown in FIG. 1 is a non limited example. The one or more satellites 102 may include sensors 104. As used herein, the term sensors is a broad term and refers to any sensors on board the satellite that generate data, and may include image sensors, instruments for Earth observation, temperature sensors (e.g., thermal imaging sensors, or infrared sensors), sun sensors, Earth sensors, power meters, attitude sensors, and the like. In some instances, at least one of the one or more satellites 102 is an Earth Observation satellite or a satellite in Low Earth Orbit (LEO) equipped with one or more imaging sensors that may be part of imaging systems such as cameras, panchromatic cameras, multispectral cameras, hyperspectral cameras, shortwave infrared cameras, near infrared cameras, wide field-of-view cameras, narrow field-of-view cameras, high resolution cameras, among others. The imaging sensors are not limited to optical sensors, other types of imaging sensors such as synthetic aperture radar (SAR) sensors, among others, may be used. The Earth Observation satellites may additionally or alternatively include other detecting devices such as methane or other substance detection devices, or any other sensor or device for gathering data from Earth. The satellite data collected by the Earth Observation satellites may include any type of data including imagery data, radar data, radiofrequency data, and so forth.

The geospatial information delivery system 100 may include one or more processors 106, which may be central processing units (CPU), graphics processing units (GPU) or both CPU and GPU, and/or any other sort of processing unit, such as, for example, digital signal processors (DSPs), field programmable gate arrays (FPGAs), application-specific integrated circuits (ASICs), or others, such as, artificial intelligence and machine learning accelerators.

The geospatial information delivery system 100 may further include computer readable-media 108 coupled to the one or more processors 106 which may store program instructions and program modules that are loadable and executable on the one or more processors 106, as well as data generated during execution of, and/or usable in conjunction with, these programs, such as geospatial information including satellite data, image data, images, analysis results, metadata, client orders, order priorities, and so forth. The computer-readable media 108 may be non-transitory and may store various instructions, routines, operations, and modules that, when executed, cause the one or more processors 106 to perform various activities. The non-transitory computer-readable media may include volatile and nonvolatile, removable and non-removable tangible, physical media implemented in technology for storage of information, such as computer-readable instructions, data structures, program modules, or other data. System memory, removable storage, and non-removable storage are all examples of non-transitory computer-readable media. Non-transitory computer-readable storage media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the system.

The computer-readable media 108 may store one or more modules for controlling the one or more satellites 102 and the sensors 104 and/or for other satellite tasks. In some embodiments, the geospatial information delivery system 100 may include a control module 110 for handling the satellite resources such as payloads, sensors, and other subsystems on board the one or more satellites 102, including but not limited to a communications subsystem, a propulsion subsystem, an attitude and orbital control subsystem ("AOCS") module, a power subsystem, an imaging subsystem, an analysis subsystem, a planner or tasking subsystem, or any other subsystem required for the proper functioning of the satellite. In some instances, the control module 110 may control the on board storage, transmission time, transmission bandwidth, computing resources, power consumption, of a single satellite or of the constellation. In some embodiments, the geospatial information delivery system 100 may not comprise any satellite, and the control module 110, together with the other modules, may be responsible for communicating with satellites or other vehicles, or other entities from which data or geospatial information can be received, and/or for controlling the retrieval, processing, analysis and/or provision of geospatial information requested by users, and/or for receiving processed or unprocessed data from users.

The geospatial information delivery system 100 may include a user interface module 112, a pricing module 114, a mapping module 116, an order and planning module 118, and a forecast module 120. It should be appreciated that not all of the modules need be present in every embodiment, that additional modules may be present for other purposes, and that several modules may be present for one or many of the purposes described. The modules stored within the computer-readable media, in many instances, may provide for control of other systems and hardware on board each of the satellites of a constellation of satellites, and also for the control of the constellation resources as a whole. Constellation resources may refer to the resources of all the individual satellites of the constellation operating collectively and cooperatively. The resources of the individual satellites may include, but are not limited to, hardware and software resources including at least one of payload systems, storage quotas, sensors, upload or download bandwidth capacity, processors, computing capacity, power, and so forth. When the present disclosure refers to making an efficient use of the constellation or satellite resources, or to managing said resources, or the like, it may refer to usage of the satellite's batteries, distribution of computing operations based on the computational capacity or needs, optimization of data collection scheduling, propulsion required to retarget the satellites, power to activate their sensors, bandwidth and latency available for data transmission and/or reception, and the like. The geospatial information delivery system 100 may take into account the constellation resources for the provision of the geospatial information. The geospatial information delivery system 100 may collect telemetry/operational data that is used for monitoring status/health of the one or more satellites 102 and for use in decision making. For example, depending on the information collected from each of the satellites belonging to the constellation, the geospatial information delivery system 100 may perform evaluations of the available satellite resources, reprioritize tasks, create new tasks, augment sensors, extract higher level meaning, perform analytics, and allow satellite automated tasking, among other things. In some instances, the satellites may cooperate together and exchange data for monitoring their health and status, and may send this information to the one or more processors 106 of the geospatial information delivery system 100.

In some embodiments, some or all of the components of the geospatial information delivery system 100 may be ground-based or on-board a manned or unmanned aerial or space vehicle. For example, the one or more processors 106 and the computer readable-media 108 may be all or partially on the ground or on-board an aircraft or spacecraft, such as the one or more satellite 102, with such ground-based processors or one or more aircrafts or spacecrafts in communication with each other. Similarly, the methods disclosed in some embodiments may have some or all the steps performed on-board a manned or unmanned aerial vehicle, satellite or spacecraft, or on ground-based processors.

In some implementations, each satellite of the constellation may communicate with each other, with ground stations or space- or airborne stations, and/or with the one or more processors 106 of the geospatial information delivery system 100. In some instances, the control module 110 of the geospatial information delivery system 100 may be on the ground and may control the communications of the system to provide for a communication channel with one or more base stations on the surface of the Earth or with other satellites within the satellite constellation. In some instances, the control module 110 may be at least partially on board at least one of the satellites of the constellation. The control module 110 may be responsible for transmitting and/or receiving data or instructions within the components of the system, for example for transmitting and receiving data and instructions to and from other satellites within the satellite constellation, or for transmitting and receiving data and instructions to and from other similarly equipped devices such as manned or unmanned aerial vehicles, balloons, cars, ships, and sensor networks. The communication subsystem (not shown in FIG. 1) may also be included in the geospatial information delivery system 100, and may selectively transmit and receive data when a communication link has been established and may transmit geospatial information, including data such as any images, the results of image analysis, metadata, scientific data, the position of the satellite or the health of the satellite or its systems. Data received by ground stations or space- or airborne stations, or by other satellites, may then be further processed and finally delivered to the final users by a geospatial information delivery system.

The geospatial information delivery system 100 according to embodiments of the present disclosure may be configured to obtain or receive imagery data and/or any other information (as seen elsewhere in this disclosure) collected by the at least one satellite in orbit, and to further process the imagery data and/or other information to provide the users with requested geospatial information or allow the users to access the requested geospatial information. It is however to be understood that the modules or subsystems as described in the present disclosure are mere examples, and the modules can be divided into other submodules or subsystems with slightly different or overlapping functionalities. At least some of the modules or subsystems may be based on a machine learning or artificial intelligence architecture. The geospatial information delivery system may be also referred to as satellite data delivery system in some instances of the present disclosure. Throughout the present Detailed Disclosure, order is to be understood as any interaction a user makes with the geospatial information delivery system, including any request the user makes to the geospatial information delivery system, such as a request to the geospatial information delivery system to provide the geospatial information to the user, or a request to the geospatial information delivery system to allow the user to access the geospatial information, such as by searching the geospatial information and allowing the user to visualize it through the user interface or access it via the available API(s), optionally without allowing the user to further process or download it. Placing an order can thus also be understood as requesting the geospatial information delivery system to perform a search, which may further include requesting to receive the geospatial information obtained as result of the search.

The user interface module 112 may be the module with which the user interfaces, and which receives the orders or requests from the user, and which may be in the form of a web-based interface or platform in which the user may be guided to place the order with at least one attribute. The user interface module may also or alternatively be part of a downloadable program or application executable in a computer, laptop, handheld device or any other suitable device. Through the user interface of the user interface module, the user may create a personal account with personal login credentials. Through the user interface module, the user may be able to place orders, for example from said personal account, and also view information about past orders and other relevant information.

The at least one attribute may include at least one of an area of interest or point of interest for the requested geospatial information, the type of geospatial information (product) requested, the application for which the geospatial information is to be used, the start date of the collected data associated with the geospatial information, the end date of the collected data, and the frequency of the collected data. Additional attributes may include at least one of the maximum acceptable level of cloud coverage, or whether the user allows the system to perform a best effort to fulfill the order, but with the risk of the order not being fulfilled if other orders take precedence, or whether the user wants a guarantee that the order will be fulfilled. Yet an additional or alternative attribute may indicate the maximum price the user is willing to pay for the geospatial information. Yet additional or alternative attributes may include a type of data content. For example, if the requested geospatial information includes imagery data information, a type of data content may be an object or feature of interest on the image, such as trucks, airports, certain crops, etc.; if the requested geospatial information includes gas data information, a type of data content may be a gas type such as methane, $CO_2$, or any other type of gas; and so forth. In other words, the type of content may comprise a specific type of object or feature present in at least one collected image conforming the imagery data, a specific type of gas present over a specific geographical location, and so forth. Yet an additional or alternative attribute may be information related to the content of interest, for example information related to the content on the image such as change detection, status monitoring, or presence/hazard detection. In addition or alternatively, an attribute may indicate to download the geospatial information from the satellite that collected the at least one image only if a certain content is present in the at least one image. In addition or alternatively, attributes may include allowing the user to select an algorithm, such as an algorithm running on one of the satellites of the constellation, or running on the ground, to be used to process the collected data or the requested geospatial information before receiving it by the user, and may also allow the user to select a specific algorithm. In addition or alternatively, attributes may include allowing the user to select to have an agent (software, an algorithm), that can run on the ground or on board one of the satellites, and that may dynamically and autonomously decide which is the best geospatial information for a user, such as deciding which captures are the cheapest, have lowest latency, have the best sun inclination, have the best angle, have less probability of having cloud coverage—for example based on a result of a (proprietary) algorithm, etc. This attribute may not be input directly by the user, and may be implicitly present or may be selected in another way by the system. In addition or alternatively, attributes may include allowing the user to provide data to the geospatial information delivery system, so that data processing is performed on said data, and/or such that said data is stored in databases as part of the geospatial information delivery system. Other attributes may in addition or alternatively be provided. The user interface module 112 may also provide the price information to the user, information about whether the order can be fulfilled, information about a date of delivery of the requested geospatial information, and/or any other required information, and it may also allow the user to make payments, and to view, download or retrieve the requested geospatial information.

The type of product requested may include the type of geospatial information requested, including imagery data, radar data, lidar data, radiofrequency (RF) data, gas or substance detection data, or any type of data that may be derived from these. If the requested geospatial information is imagery data, or can be expressed as an image (for example, radar and lidar data could be expressed as an image, as well as some geolocated RF data or gas concentration data), the type of product may further include the type of imagery data, and may include information that indicates at least one of the size of the pixel resolution of the image, such as 1 m, 90 cm, or the like, multispectral image, hyperspectral image, video, or any other suitable type of imagery data. The type of product may also allow to indicate whether the requested geospatial information should have a latency below or above a specific latency value, or there may be different types of product that are defined by their latency, or the required latency may be indicated as a separate attribute. For example, one type of product may include imagery data of a resolution of 1 m with a latency of below a certain threshold, another type of product may include video frames of 50 m resolution with a latency of above a certain threshold but below a maximum latency value, and so forth. If the user indicates that the geospatial information should have a predetermined latency (e.g. a latency below a specific latency value), the geospatial information delivery system may automatically determine whether it is possible to satisfy said requirement, by for example determining whether the data associated with the geospatial information may be collected by a satellite and transmitted to other satellite or ground- or airborne station, so that it can be provided to the user within the required timeframe.

The type of product may in addition or alternatively allow to (implicitly or explicitly) indicate the sun elevation corresponding to the moment of capture, the off-nadir angle corresponding to the moment of capture, the exposure time corresponding to the moment of capture, frequency band information of the image, whether the image is orthorectified, information quality metrics, such as image noise or signal to noise ratio (SNR), geolocation accuracy and/or error, image sharpness, modulation transfer function (MTF), radiometric accuracy, and the like. In addition or alternatively, if algorithms are run in the geospatial information delivery system, such as machine learning algorithms, such as for performing content based (image) analysis, additional attributes may include classification accuracy, precision, recall, scores such as the F1 score, errors, classification probabilities, of the algorithm, and so forth. Some or all of these parameters may however also be provided as separate attributes of the user order.

The type of application for which the geospatial information is to be used includes at least one of a list comprising, but not limited to, analytics, agriculture, meteorology, cartography, humanitarian purposes, research, and geology. Data for different applications may have different latency and/or quality requirements. For example, for different applications, different levels of data compression could be acceptable, as for certain applications a higher compression rate with a higher loss may be acceptable, and this will result in less amount of processed and/or transmitted data. The type of application may also allow to indicate whether the geospatial information should have a latency below or above a specific latency value, or the latency may be indicated as a separate attribute. For example, a certain application for the geospatial information may be such that, when selected, it allows the geospatial information to be provided with a latency below a specific latency value, but also with a quality below a specific quality value, while another application may be such that it allows for a larger latency for providing the geospatial information, but with higher quality, or the like. By allowing the users to select different types of applications, also different types of data may be provided, which may allow to provide to each user the type of data that was requested, reducing unnecessary transmission/retrieval and processing of data, and also adapting the price of the provided data to the user's requests.

The start date of the collected data associated with the geospatial information and the end date of the collected data may both be in the past, and the geospatial information may be obtained from collected data stored in a database. The start and end date may be such that the starting date is in the past and the end date is in the future, or both dates may be in the future. The start date and the end date of collection may be any date, such as one day, week, or month from the date of placing the request, or one day, ten days, one month or six months before placing the request. The frequency, or recurrence, of the collected data associated with the geospatial information may be given as a period of time, such as once a day, a week, a month, or the like, between the start and the end date. The frequency may also be given as specific dates between the start and the end date. The frequency may also be given as once, twice, or any other suitable amount between the start and the end date, possibly with different attributes for each capture (such as off-nadir angle or sun elevation). In this case, the user may not have a strict requirement for a specific date, and this may allow the geospatial information delivery system 100 to schedule the user order for the best suitable moment for managing the satellite resources within the constraints given by the user.

The maximum acceptable level of cloud coverage may be given as a percentage, as a fraction of a total, or the like, the total being complete visibility, or completely clear sky.

The attribute indicating the maximum price the user is willing to pay allows the system to put a cap on the options for geospatial information given to the user.

The attribute indicating whether the user allows the geospatial information delivery system 100 to perform a best effort to fulfill the order, but with the risk of the order not being fulfilled if other orders take precedence, or whether the user wants a guarantee that the order will be fulfilled, can also be known as the best-effort/lock-in attribute. This attribute may be provided as a boolean, or as a number with a certain value, for example. If the user selects the best effort option (for example, best effort=TRUE or lock-in=FALSE), the geospatial information delivery system may try (make a best effort) to fulfill the user order, and may assign a price and a priority to the order. The best effort option can also be referred to as spot option since it is related to the spot opportunity, to have the opportunity of getting a spot for having the order satisfied. If however the user selects the guarantee option, also known as lock-in option (for example, best effort=FALSE or lock-in =TRUE), this may mean that the user is not willing to risk not being provided with the requested geospatial information at the requested location, time and/or with the requested other attributes. The guarantee option can also be referred to as reserved option since it is related to the user reserving the opportunity to make sure that the order will for sure be satisfied.

The attribute including a type of content of interest in the image, when the requested geospatial information includes imagery data, may indicate elements, objects or features of interest for the user in the images. For example, a user may be interested in the trucks or ships present in the imagery data, and not be interested in any other content. The user may thus be able to include the type of content of interest as an attribute when placing the order. Based on a semantic analysis, a semantic search/analysis module (not shown in the figures) may classify images or imagery data based on the content, using artificial intelligence or machine learning algorithms. For example, an image can be analyzed and information can be extracted, for example by applying at least one of segmentation (such as 3D segmentation), labeling, object recognition, or other appropriate operations to identify and potentially count the number of objects or features of interest, indicating that the image comprises three trucks, two ships, one car, and five buildings. This provides an additional classification element which increases the variety of products available for the users. The semantic analysis may be performed on the ground or on board the vehicle. The semantic analysis may be performed after the user selects the attribute. For example, the user may want to find bridges located in an area on the Earth selected by the user, hence the semantic search/analysis module performs the semantic analysis to find the bridges in the selected area. Alternatively, when the type of content of interest in the image is frequently requested by the users, or if decided by other reasons, the semantic analysis may be performed before the user selects the attribute, and the results of the semantic analysis may be stored for later use. For example, the users may frequently place orders selecting parking lots as an attribute. Hence, the semantic search/analysis module may determine which areas or coordinates on the Earth have parking lots, may compute or determine semantic labels, and may associate the semantic labels with the areas or coordinates (or even tiles and/or MDUs associated with the areas or coordinates), and store this information that may be used to speed up the semantic analysis or search performed after the user selects an attribute which already has a semantic label. By operating in this manner, the system may learn about different areas or coordinates on the Earth and may optimize the processing resources, reducing the computation time or power required to identify, select or retrieve the data and provide it to the user.

When the request or order to be satisfied with this requirement is for imagery data captured in the past, a database or catalog from which the imagery data can be retrieved may also include the content information of the semantic analysis, and the imagery data can be queried and retrieved by the geospatial information delivery system 100 based on said content information. Retrieved imagery data may comprise only specific semantic layers related to the type of content requested. Semantic layers may be derived from the content-based (semantic) analysis. Semantic layers of image analysis may include cars count in the image, location of rivers or roads, speed of vehicles, population density, buildings footprints or height, information about ships, fires, containers, tanks, planes, any object or feature, its presence, its bounds or its counts. In other words, anything that could be the result of applying an analysis algorithm on an image can be included in a semantic layer, and a semantic layer may contain numbers, quantities, multidimensional vectors, pixels, images or any information expressed in any other digital format. When the order is for imagery data captured in the past, alternatively the semantic analysis of the images in the database or catalog can be performed in real time or near-real time with the order, to identify images within the database or catalog with the type of content indicated in the order. The geospatial information delivery system 100 may include a semantic map, such as a semantic heatmap, to be used for the semantic search and/or analysis, containing information indicating the probabilities of certain features and/or objects of being present in different areas of the heatmap, such as in each tile composing a grid into which the heatmap may be divided. This semantic map may be derived from pre-calculated a priori information, or past content-based information from data collected for at least some areas. For example, for features or objects that change slowly over time, such as forests, cities, buildings or structures such as bridges, wells, ports, airports, roads, rivers, and so forth, it may be advantageous to have, for at least some tiles or for each tile of the semantic heatmap, information indicating the probability of presence of different features or objects in said tile, so that, if a user requests geospatial information from the past of an AOI or POI including one or more tiles, the AOI or POI containing at least one feature or object, the information in the semantic heatmap may be used when performing the content-based image analysis, to identify in a faster way the tiles or areas in which the feature or object is more likely present, and perform content-based image analysis in said tiles only, thereby optimizing the amount of resources required to perform the content-based image analysis by, for example, reducing the computing time for the analysis. In some implementations, the heatmap may provide enough information so that it is not required to perform further content-based image analysis. For example, if a user requests geospatial information in the form of images from the past containing specific features, such as airports, with or without indicating a specific location, the system may search, identify, select or retrieve the images containing airports from the database/catalog using the information provided by the semantic heatmap. In some instances, the semantic heatmap may store importance or significance values associated with tiles, MDUs, geographical coordinates, or similar, and may provide this information for use by other modules of the system. The information in the semantic map may be updated based on new captured data, as frequently as needed, depending on the rate of change of each feature or object. This semantic map may be stored on the ground and/or on board a satellite that is collecting data. The semantic map may be stored requiring a small amount of information, so that it requires little storage space, such as for example by having a bitmap comprising at least one bit (for example one bit) per semantic layer or semantic category (e.g., per object or feature) and at least one bit per tile (for example one bit) (and/or MDU, coordinates, square meters, or similar).

In such cases in which the order is for imagery data captured in the past and archived, the archived imagery data may thus be re-processed or further-processed as needed to satisfy customer demands, for example in relation to semantic layers that are not archived but can be computed. In addition or alternatively, archived data may be processed at a later moment even if no content-based (semantic) analysis or search is to be performed. For example, when data is retrieved from the archive/database, depending on the type of product the customer has ordered, it may be necessary to reprocess or perform further processing or analysis on the archived data, for example if new types of product can be ordered, they may be generated from already archived data (for example super-resolution or other types of quality improved-data). This may have an impact on the cost and price of the geospatial information provided to the user.

When the order to be satisfied with this requirement includes imagery data to be captured in the future, as an image is captured, content-based image analysis is performed by the geospatial information delivery system 100 in order to determine objects or features of interest present in the image. If the user ordered imagery data including trucks, every time an image is captured and analyzed, and the analysis determines that there is a truck, geospatial information requested associated with said image may be provided to the user. The content-based image analysis may be performed in real time or near-real time after an image is collected. If the user order includes additional attributes, the images where the analysis determines that there is a truck, and the other attributes also match the order, may be provided to the user. The imagery data provided to a user that included this attribute in the order may include a lower amount of imagery data than the imagery data provided to another user not including this attribute, as for example the user may only receive information indicating the number of objects of interest present in the image, thereby reducing the amount of data the user needs to download and manage.

The semantic map may also be used to perform content-based image analysis when the order includes imagery data to be captured in the future. For example, if a user requests imagery data containing specific features or objects, such as bridges, the semantic map may be accessed by the geospatial information delivery system to obtain information indicating the probability of presence of the specific features or objects in at least some tiles. This may allow to reduce the computing resources such as time or power used for the analysis, and/or to target the places in which a certain feature or object is likely to be present, so as to reduce the amount of captured data. The semantic map may be stored with a small amount of information. When the semantic map is used to perform content-based image analysis of data to be captured in the future, the semantic map is a probability map (the probability of presence of a feature of interest). To reduce the storage required, thresholds on the probability of presence may be pre-decided and information can be reduced by storing a bit meaning if the probability is higher than a predefined probability threshold (i.e. store a 1 if the probability threshold is higher than what is required to capture if a bridge is possibly present). If different probability thresholds are required (for example for different uses), 2 bits per label probability will enable representing 4 different probability thresholds (e.g. store 00 if "bridge presence probability" is below a minimum threshold, as in "don't capture", store 11 when "there's a high probability of a bridge", use 01 and 10 to represent intermediate probability levels, so as to let the end user decide how much they want to risk paying for images with no bridges, versus how much they are willing to risk to miss some bridges. More bits and different encodings could be used to represent more options, and the semantic maps (probability maps) could be stored compressed to reduce storage and transmission requirements.

The content-based image analysis may be performed in different parts of the geospatial information delivery system 100. For example, the analysis may at least partially be performed on the ground, once the geospatial information has been downloaded from the satellite, and/or the analysis may at least partially be performed on board a satellite, such as on board the satellite that collected the data associated with the geospatial information or on board a different satellite receiving the data in orbit. If the satellite performs the content-based image analysis, the satellite may automatically determine whether the image contains the attribute indicated by the user, and may autonomously decide whether to transmit the image (or data derived therefrom) so that it is provided to the user, on a regular channel, or on a high priority (more expensive) channel, or decide to only transmit analysis results on a low-bandwidth low-latency channel, or to use a high loss compression algorithm to reduce the amount of data to transmit, or a combination of them, or to discard some portions or all of it.

In the attribute indicating information related to the content of interest, a user may indicate in the user order that the user would like to receive images tracking a specific object or feature of interest, such as a train or a ship in movement, or following a river, or any other object or feature-specific content. As another alternative or additional example, the user may indicate in the user order that the user would like to receive information related to the content of interest on the image such as change detection, status monitoring, or presence/hazard detection. The semantic analysis of the image content may be used to also determine whether the desired features or objects are present in the image when the image is captured. In this case, also the analysis may be performed on board the satellite that collects the image, or at another location. If the analysis is performed on board the satellite, the satellite may autonomously determine whether an image contains the requested object or feature to be tracked and act accordingly.

The attribute indicating to download the geospatial information from the satellite that collected the at least one image only if a certain content is present in the at least one image may be provided explicitly or may not be provided, and the geospatial information delivery system 100 may automatically decide whether to download the geospatial information (or the collected data associated with it) depending on the result of the content analysis, as seen above. In addition, if a (software) agent is used to act on behalf of the user, the agent may make this decision.

The attribute allowing the user to indicate that at least one algorithm selected by the geospatial information delivery system, such as an algorithm running on one of the satellites of the constellation, or running on the ground, be used to process the collected data or the requested geospatial information before receiving it by the user, and/or allowing the user to select the specific algorithm to process the collected data or the requested geospatial information, may allow the geospatial information delivery system 100 to process the collected data or the geospatial information, and optionally autonomously make decisions based on the result of the execution of the algorithm. In addition, if a (software) agent is used to act on behalf of the user, the agent may make these decisions.

The attribute allowing the user to provide data to the geospatial information delivery system, so that data processing is performed on said data, and/or such that said data is stored in databases as part of the geospatial information delivery system, allows the user to input data and further have it processed by the geospatial information delivery system. Alternatively or additionally, the attribute may allow the user to input algorithm(s) to be executed by the geospatial information delivery system.

Figure 2A:
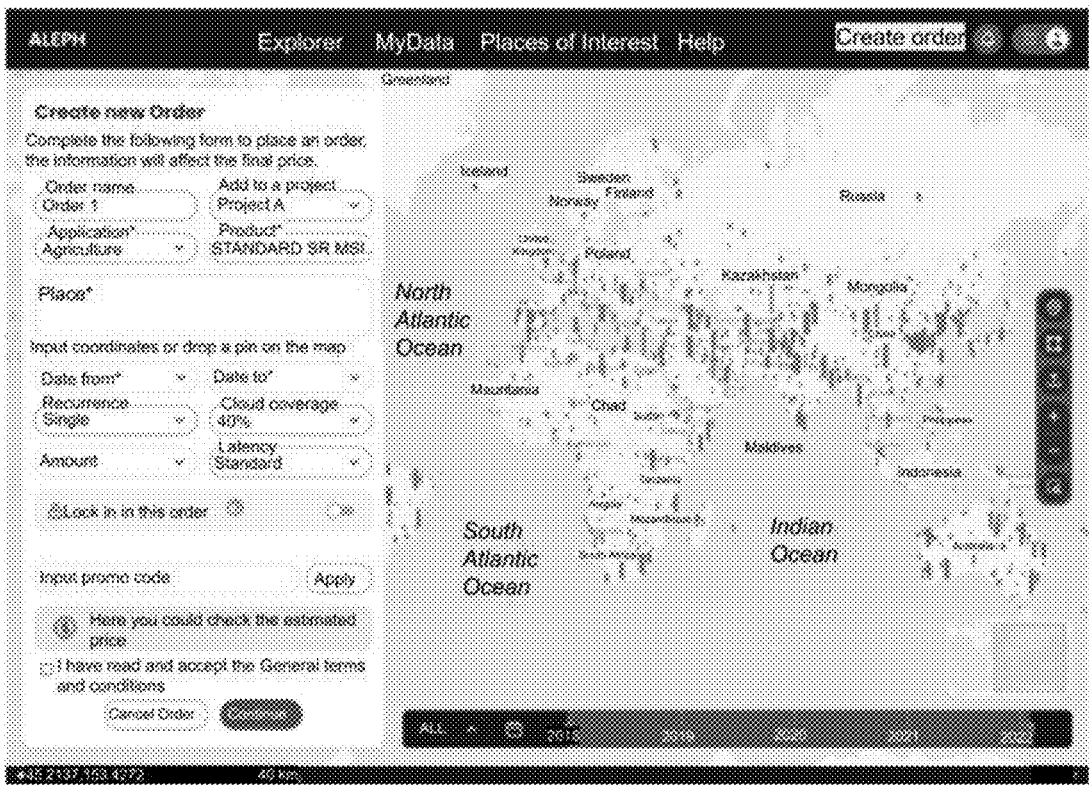
FIGS. 2A-2D schematically show examples of user interfaces according to embodiments of the present disclosure.
Figure 2B:
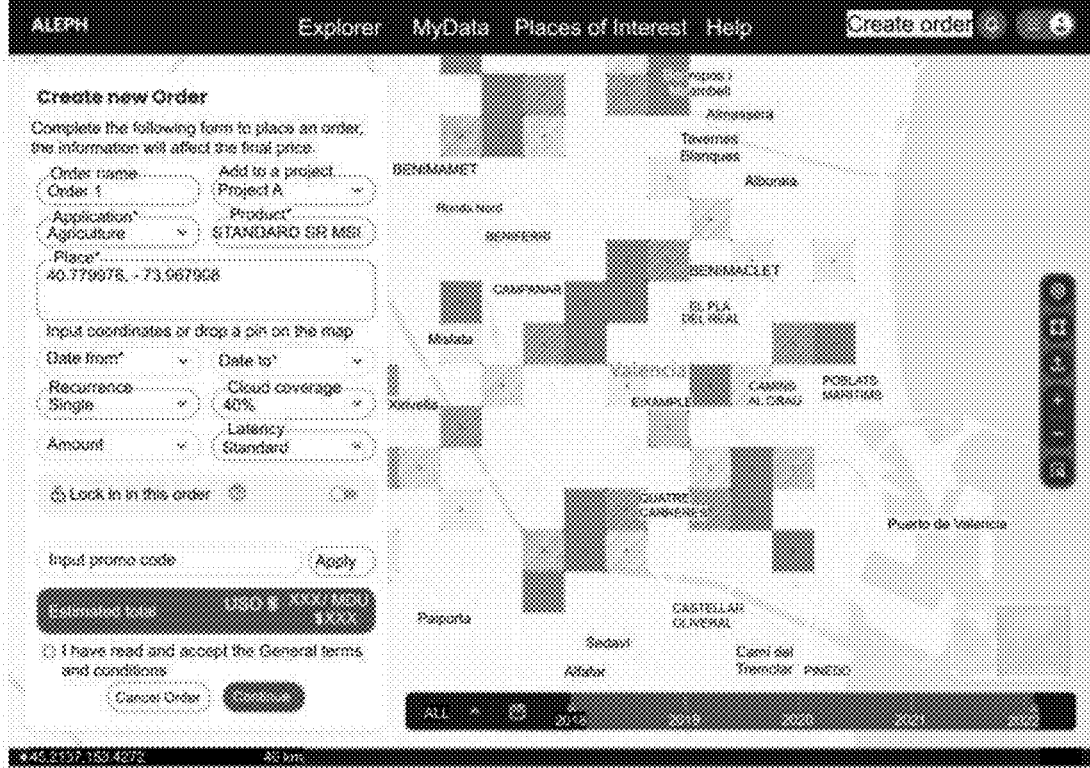
Figure 2C:
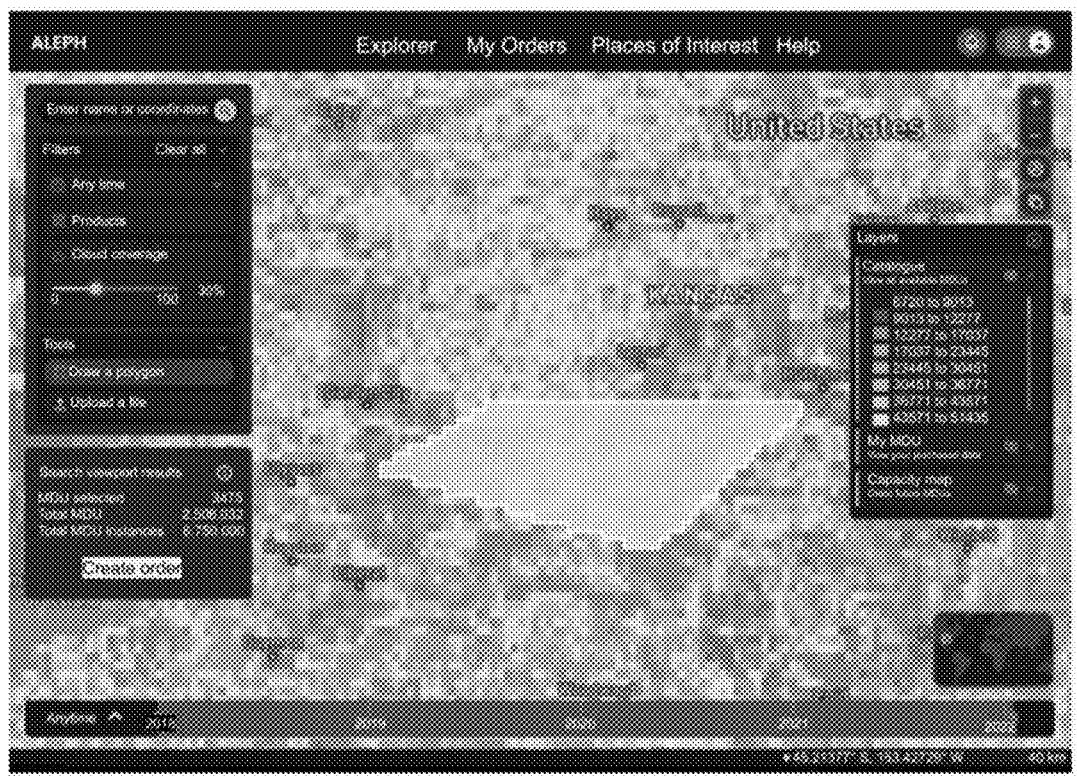
Figure 2D:
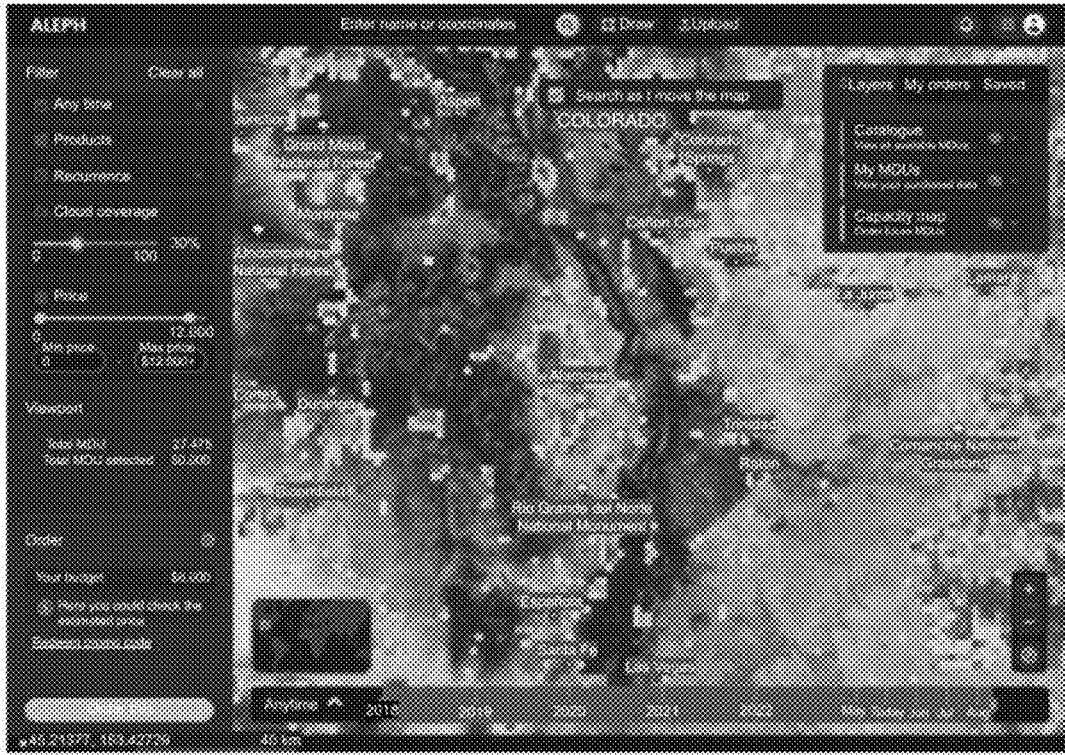

FIGS. 2A-2D schematically show examples of user interfaces of the user interface module 112 according to embodiments of the present disclosure. For example, FIG. 2A shows a user interface through which a user can begin to place an order, and the attributes that the user may give are at least one of a type of application, a type of product, an area of interest (which can be selected directly by selecting an area or a point in the map, optionally after having zoomed the map in), the start and end date of the order, the recurrence or frequency, the maximum percentage of cloud coverage allowable, the latency, the possibility to lock in the order, that is, to have a guarantee that the order will be fulfilled, and the possibility to input a promo code. FIG. 2B shows another example in which the map is zoomed in, and the tiles into which the map is divided are shown, and the user is able to select one or more tiles delimiting the area of interest. The concept of tile will be explained in detail further in this Detailed Description. FIG. 2C shows another additional or alternative example in which the user is able to draw an area of interest on the map, and all the tiles covering at least partially the drawn area are selected by the system as the area of interest. FIG. 2D shows an additional or alternative example in which also the attribute of indicating the maximum price of the geospatial information can be input by the user. In all these examples, which are not limiting and it is clear for the skilled person that other examples are also envisaged by the present disclosure, if the user changes the attributes through the user interface module 112, the changes in the price are also dynamically displayed for the user.

Through the user interface module 112, information may be shown indicating the available areas of interest, so that the user knows where the selection is possible. This allows to reduce the amount of user-system interactions and simplifies the operation. In addition or alternatively, through the user interface module the geospatial information delivery system can show the user the prices in the different areas of interest, or in all the areas shown through the user interface, so that the user can be aware of the areas with higher prices. This provides transparency for the user. In addition or alternatively, through the user interface the user can interact with the requested geospatial information in different ways. For example, the user may view the geospatial information, process the geospatial information, and/or download the geospatial information. The amount of information available to the user for each of these options may vary, and also the price associated with the geospatial information may vary depending on the option, as described elsewhere in this Detailed Description.

In addition or alternatively to the user interface module 112, the geospatial information delivery system 100 may have an application programming interface (API) module (not shown in FIG. 1) that allows users not only to request geospatial information, but which also may make it possible for users to access, through the API module, the geospatial information and the different modules and subsystems of the geospatial information delivery system 100. The API module may provide a single API for dealing with all the possible variations of geospatial information requested by a user, instead of having different APIs for different types of geospatial information. For example, one and the same API may be accessible by the user regardless of whether the user requests archived geospatial information (geospatial information from the past), future geospatial information, analytics information, or any combination. This simplifies the documentation and specification required for the internal structure of the geospatial information delivery system 100. By interfacing with the API, users may be able to access the geospatial information made available by the geospatial information delivery system and use or train their own algorithms (such as machine learning, artificial intelligence, or other types of algorithms) taking said geospatial information as input, and interact with the API to provide also processed data as result of their algorithms. According to some embodiments, other websites such as marketplaces may be created which may interact with the API of the geospatial information delivery system. Many or all of the functionalities that are available through the user interface module 112 may be available also through the API module. In addition, if a (software) agent is used to act on behalf of the user, the agent may interact with the API module to access the different modules and subsystems of the geospatial information delivery system 100 and make decisions.

The control module 110 may be in charge of interfacing between the user interface module 112 and the other modules, and may be configured to control the overall operation of the system.

Figure 3A:
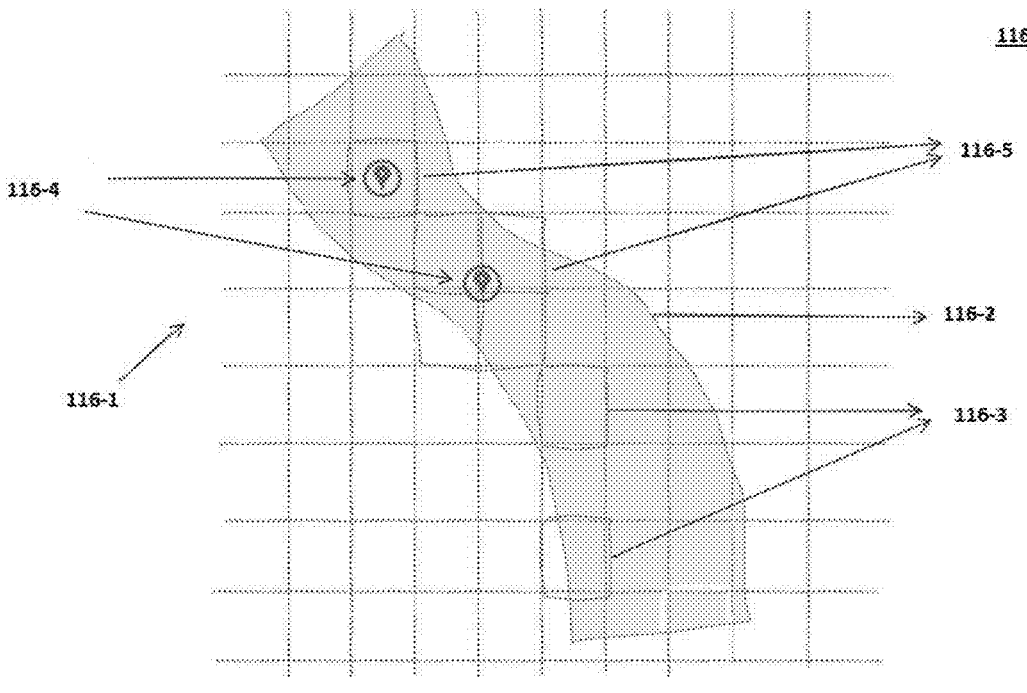
FIGS. 3A-3C schematically represent the structure of the operation of the mapping module in an exemplary embodiment of the present disclosure.
Figure 3B:
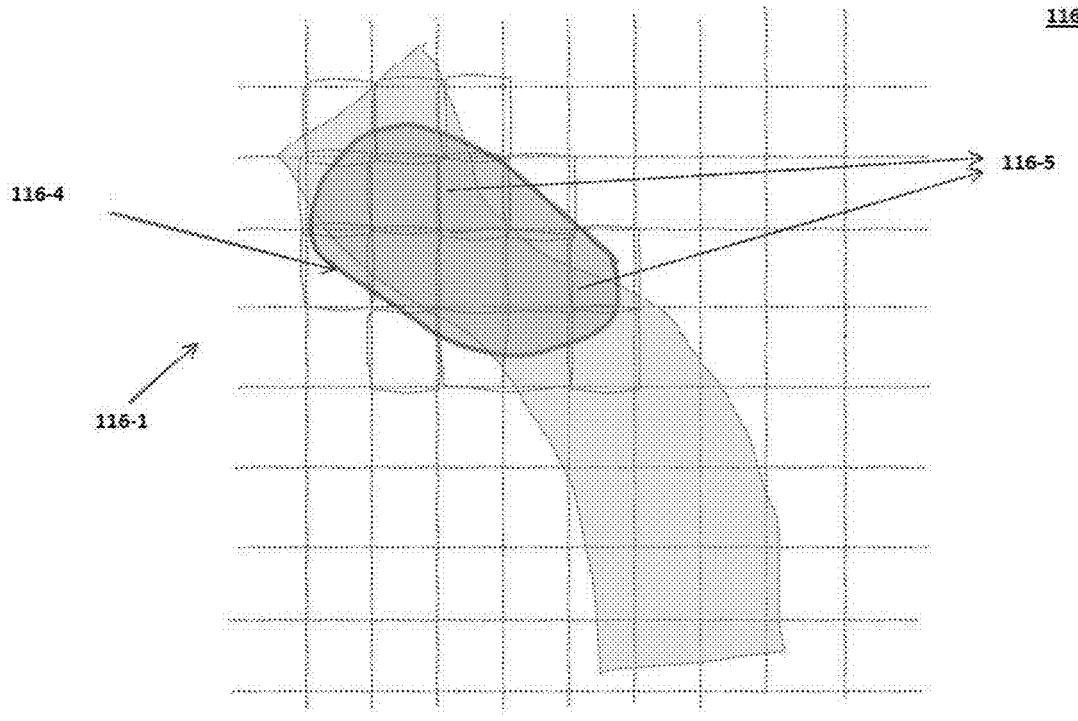
Figure 3C:
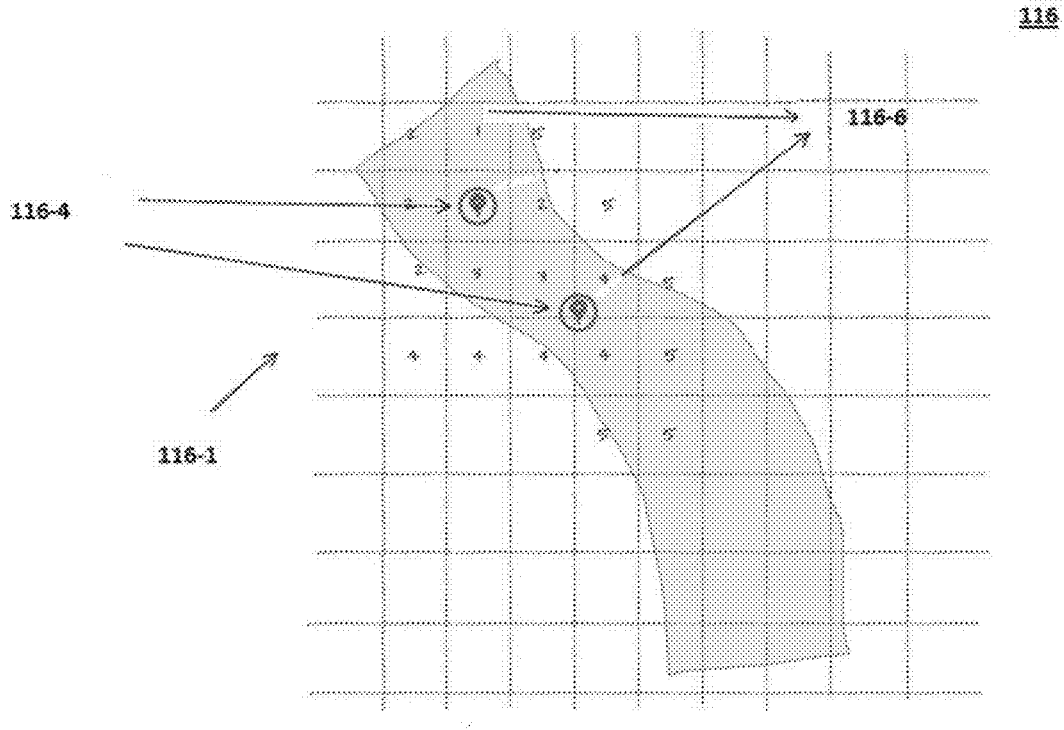

The mapping module 116 may be in charge of assigning a mapper value or ranking to the geospatial information requested by the user. This mapper value may represent the level of importance or worth of the geospatial information, and may allow to assign priorities and price to the orders for geospatial information and to plan and task the satellite fleet based thereon. FIGS. 3A-3C schematically represent the structure of the operation of the mapping module in an exemplary embodiment. The mapping module may comprise (or communicate with and update) a database, which may comprise a heatmap 116-1 of the Earth throughout time in which, for each time interval (such as for each day, hour, minute) a map of the Earth is provided.

The heatmap 116-1 used by the mapping module 116 may be part of the database where the data and geospatial information from the past are stored, or it may be part of a different database. The database where the data and geospatial information from the past are stored may be referred to as a catalog, and may be stored on the ground or on board at least one satellite. The heatmap may also be stored on the ground or on board at least one satellite. The catalog and the heatmap that the mapping module uses (in case that they are not the same database) may be divided in similar or identical ways, so that the user interface module and the API allow to select areas in a map (as seen in FIGS. 2A-2D), and such areas should be accessible in the same way in the catalog and in the heatmap used by the mapper module. The areas into which the catalog and the heatmap are divided can be determined in different ways, and the present disclosure is not limited to any way of providing the areas. As an example, the heatmap and the catalog can be divided in a gridded manner into tiles, and each tile (shown in FIG. 3A as 116-3 as part of the heatmap 116-1) may correspond to the area. The dimensions of the tiles may vary, and may for example be between 500 m by 500 m and 50 km by 50 km, more preferably between 1 km by 1 km and 32 km by 32 km, or more. These are however examples and other tile sizes or tile shapes are also conceived by the present disclosure. The tiles may be adjacent to each other or may have a certain degree of overlap along their respective edges, which allows to more accurately address map projection adjustment and geolocation uncertainties. When collecting satellite data, a stripe corresponds to the area where data is collected by a satellite when passing over a specific area. A stripe can be in any shape or form: oblique stripe, short stripe, long stripe, straight, curved, etc. A tile may correspond to a stripe, but a tile may instead correspond to a unit of the grid that composes a gridded map (the heatmap or the catalog), in such a way that stripes may be split in tiles which may be equally on unequally spaced.

In the exemplary embodiment of the heatmap and the catalog being divided into square or rectangular tiles, the user may place the order for at least one tile, or a specific area such as a city or an area defined by coordinates, metadata, an area of interest (AOI), or a specific point on the map, a point of interest (POI). In this case, if the order is placed for an area or point that crosses the border between tiles, the corresponding geospatial information for all the tiles covered by the area may be provided. This can be seen in FIG. 3A, which shows an example of how the tiles may be defined with respect to a stripe 116-2 of imagery data collected by the satellite(s), and it shows points of interest 116-4 being marked on the map, wherein if one point is in the intersection between tiles, all the tiles with which it intersect 116-5 may be selected for delivery of the geospatial information. Similarly, FIG. 3B shows a selected area of interest 116-4 (by means of coordinates, or marking the area on the map, or another manner) and the tiles which are at least partially covered 116-5 by the selection may be selected for delivery of the geospatial information.

Each tile of the catalog may be a container of information, which may include geospatial information associated with (or corresponding to) the area covered by the tile, such as information related to radiofrequency, substance detection, or imagery data. Each tile may have at least one entry of geospatial information, also called minimum deliverable unit (MDU), and each MDU may have specific metadata associated with it. In certain embodiments, instead of or in addition to each MDU within a tile having associated metadata, the tile may have metadata which includes information associated with all the MDUs within said tile, for example indicating the type of product or application of the geospatial information that is stored in the MDUs within said tile, semantic labels or semantic layers, and other relevant information. If a semantic map containing information related to the presence of different features or objects is present in the geospatial information delivery system, this semantic map may be part of the catalog, such that at least some tiles of the catalog may contain information related to the probability of presence of certain attribute(s) and/or object(s) within said tiles. The semantic map may alternatively be different from the catalog, and may be in a different location, as described elsewhere within this Detailed Description. In at least one embodiment, a tile may contain at least one image associated with (or corresponding to) the area covered by the tile, such as multiple images captured at different times. Each image together with metadata including information associated with said image may constitute an MDU. The metadata provides additional information and parameters related to the image. Metadata is to be understood as generally referring to any information related directly or indirectly with the collected data associated with the geospatial information.

The metadata may comprise information related to the date and time of collection of the image, the type of product corresponding to the image, the type of application for which the image is available, information identifying the satellite which captured the image, the coordinate reference system in which the image is presented, the percentage of cloud coverage in the image, the valid pixels in the image (for example valid pixels excluding clouds), the sun elevation corresponding to the moment of capture, the off-nadir angle corresponding to the moment of capture, the exposure time corresponding to the moment of capture, frequency band information of the image, whether the image is orthorectified, satellite telemetry, health of the satellite system, temperature of the satellite system, data from additional sensors, information quality metrics, such as image noise or signal to noise ratio (SNR), geolocation accuracy and/or error, image sharpness, modulation transfer function (MTF), radiometric accuracy, and any other additional relevant information. The metadata may also comprise information related to a type of content, that is, a type of object or feature of interest present in the image (e.g. truck, corn field, oil tank, airport, beach), if the image has been analyzed for detecting objects, for example using artificial intelligence or machine learning algorithms. The metadata may be the information accessed by the geospatial information delivery system to retrieve the MDU(s) associated with the geospatial information requested by the user, where the at least one attribute in the user order matches at least one attribute of the metadata of the MDU(s).

In the heatmap that the mapping module uses, for each area (such as tile) into which the heatmap is divided and for each time unit (hour, day, week, or the like), there is provided information associated with the orders (requests) placed for said area, such as the number of orders placed and/or information about the attributes of each order. In addition, and based on the at least one attribute of the user order, for each area for which the geospatial information is requested at a certain time, information may be given about the mapper value assigned. This mapper value may correspond to a ranking, for example between 1 and 10, between 1 and 100, or any other suitable manner, and it may be a representation of how valuable or how important the geospatial information, such as the imagery data, in said area may be. The mapper value may even correspond to the actual price of the order placed for said area and time, or a combination, such as the sum of the prices of all the orders placed for said area if there is more than one order placed. In such a way, each tile of the heatmap will have a value which provides information about the total price that would be paid by all the users if their orders in said tile are fulfilled.

The mapper value may initially have a starting value for each area, which may then be dynamically updated as orders are placed. For example, for each new order placed for a tile and time, the mapper value for that order may be obtained based at least partially on weights assigned to the attributes present in the current order placed by the user, such as by performing a series of mathematical operations (such as multiplications) taking into account such weights. In addition, the mapper value of the tile may take into account all the orders present for said tile. For example, the mapper value of the tile may correspond to the sum of the mapper values of all the orders with at least the end date in the future present for said tile. In addition, the mapper values for said tile of the orders with the end date in the past may also be taken into account when determining the mapper value of the tile. For example, if a certain tile has at a certain moment a certain amount of orders placed, that may influence the price for new orders placed for said area in the future. The mapper value may include or be based on predictions of future orders and attributes as inferred from past records or knowledge of on-going or future events (such as social or cultural events, political or military activity, environmental or humanitarian events, weather predictions, etc).

The mapper value for an order may be determined by the mapping module 116 depending on at least one of the type of product in the user order, the location where the geospatial information is requested, the extension of the surface area of the user order, the type of application in the user order that will be provided to the user, or may be determined in another way, for example it may also take into account the location where the user is located or where the user account is created. For example, depending on whether the user indicates a type of product or another, the mapping module may assign a different weight to this attribute, which will contribute to the determination of the mapper value. For example, an order for a lower resolution image may have a lower weight than an order for a higher resolution image, as the amount of data to be provided is also different. For another example, depending on the type of product, it may be required to activate a certain satellite payload, such as a gas detection payload for detecting methane or an imaging payload for collecting imagery data, steering the payloads of at least one satellite to point at the requested area, processing the captured data, etc. For another example, depending on the SNR required for an image, certain payloads or certain specific image processing may need to be used, thereby more resources. This may also affect the weight given by the mapping module to this attribute. For another example, depending on whether the user indicates a type of application or another, the mapping module may also assign a different weight, because for example the amount of data to be provided for agricultural purposes may be different from the amount to be provided for infrastructure purposes.

If the order has the end date in the past, the mapper value for said order may also take into account how long ago the data associated with the geospatial information was collected. The older the data, the lower the weight applied to said attribute may be.

In addition or alternatively, the mapper value assigned for an order in an area and time may be based at least in part on the revenue obtained from providing to users geospatial information from that area in the past and/or on the effective cost for the satellite constellation system and geospatial information delivery system of having collected, processed and provided said geospatial information. This effective cost may also take into account the use of resources to determine which satellite(s) from the constellation are suitable for collecting the imagery data associated with the geospatial information, such as capturing imagery data, to steer the camera's of at least one satellite to point at the requested area, to process the captured data, etc. Alternatively, the mapping module may not take these elements (past revenue, past effective cost) into account, and they may be taken into account by the forecaster module. Also or alternatively, the maximum acceptable level of cloud coverage can be taken into account by the mapping value, because requesting a low level of cloud coverage in an area very often covered by clouds may require several passes of the satellites to obtain images that fulfill the requirements of the order.

In addition, the mapper value assigned for an order in an area and time may take into account a type of data content indicated by the user, information related to the content of interest indicated by the user (change detection, status monitoring, presence/hazard detection, or the like), whether the user has indicated to download the geospatial information from the satellite that collected the at least one image only if a certain content is present in the at least one image, whether the user has selected that an algorithm selected by the geospatial information delivery system, such as an algorithm running on one of the satellites of the constellation, or running on the ground, be used to process the collected data or the requested geospatial information before receiving it by the user, or whether the user has selected which algorithm in particular to process the collected data or the requested geospatial information before being received by the user. These attributes may require some kind of data processing which may include on board computing on the satellite.

For example, if the content-based image analysis is performed on board the satellite, the satellite may automatically determine whether the image contains the attribute indicated by the user, and may autonomously decide whether to transmit the image (or data related to it) so that it is provided to the user, or to discard it. This may be a factor taken into account in the determination of the mapper value. In addition, the satellite may automatically decide that the content of the image is of a relevance or a priority higher than a threshold, and in such case autonomously decide to transmit (download) the image with highest priority. This may also be a factor taken into account in the determination of the mapper value, as using communication channels with lower latency may require a concentration of resources, or a delay in the transmission of other data. For example, downloading data in the next pass over a ground station may have a lower value (and result in a lower price) than downloading data using a real time or near real time communication channel. If the content-based data analysis is performed on-board the aerial or space vehicle, the mapper value (and in turn the price) may be decided or determined after the content-based data analysis has been performed. In addition, it may happen that transmitting less data has a lower contribution to the mapper value, while using on-board computing power and energy increases the mapper value and in turn the price, and the balance between the two may encourage the user to improve algorithmic efficiency (of algorithms uploaded by the user) and channel utilization. The geospatial information delivery system may compute operations to estimate a price and provide different options taking into account this trade-off or balance, and/or other trade-off or balances considering the satellite and/or constellation resources. In certain embodiments, when the analysis of data is performed on-board the aerial or space vehicle, an additional component of dynamic pricing can be added by the geospatial information delivery system. This is because the algorithm running on-board may determine, based on the content-based analysis and on the order attributes and other system characteristics, the mapper value (in turn the price) and the products to be provided. For example, there may be several algorithms available to be run on-board on the collected data, and the mapping module may additionally perform the task of assigning mapper values to the different algorithms, so that when there is a conflict and more users select to run algorithms than computing power is available, a priority order can be assigned. In addition, mapper values can also be assigned to the opportunity cost of running algorithms, to the opportunity cost of downloading data using different communication channels, and the like. These are examples of the many operations that may take place on-board the manned or unmanned aerial or space vehicle when it performs the content-based analysis. In such scenarios, the user may indicate as an attribute a maximum price, or a price range, and the final price may be determined by the geospatial information delivery system, only after data is captured and the analysis is made by an algorithm which may be running on-board a manned or unmanned aerial or space vehicle, or on the ground. In addition or alternatively, if a (software) agent is used to act on behalf of the user, the agent may determine the most suitable options for the user in terms of for example latency, quality of data, content, and decide a price that is acceptable by adjusting the attributes given to the geospatial information delivery system, on-board a satellite (manned or unmanned aerial or space vehicle), or on the ground.

An example formula for determining the contribution of the on-board analysis or computing into the mapper value may comprise:

$$TotalPrice = Coms\_Price + OBC\_Price$$

Where $$Coms\_Price = DataBytes * PricePerByte\_ch$$

$OBC\_Price =$ $(OBCTime\_s * OBC\_PricePerS) + (OBCEnergy\_joules * PricePerJoules)$ Where
Coms_Price=Communication price
OBC_Price=On Board Computing price
DataBytes=Size of data to transfer (in bytes)
PricePerByte_ch=Price per bytes of data to transfer, depending on channel used (regular, high priority, low-latency, etc)
OBCTime_s=Time used for analyzing image on-board (in seconds)
OBC_PricePerS=Price per second of on-board computing
OBCEneryjoules=total energy used for on-board computing
PricePerJoules=Price per joules of energy used The example formula shown above is to be taken into account in the determination of the mapper value(s) performed by the mapping module 116. The resulting mapper value(s) may then be used by the forecast module 120 to prioritize the planning, and the on board computing, the communication channel and bandwidth may have an effect on the priorities because it may be an important factor determining the mapper value(s). Alternatively, the example formula may be combined with the price calculation performed by the pricing module 114, which may take as input the at least one attribute of the user order, the mapper value(s) from the mapping module 116, the estimation output from the forecast module 120, and any additional attributes that may affect the price as shown above.

If the user has indicated in an attribute a specific latency (threshold) for the geospatial information, this attribute may also have an effect on the mapper value. For example, geospatial information being provided with a latency higher than a certain threshold may be cheaper, as it may give the forecast module more freedom to find non-conflicting opportunities, and put less constraints in the order. The forecast module can determine when there is an opportunity for collecting data based on the constellation resources, whether an opportunity has a lower or higher priority conflict or value, and the mapping module may assign a mapper value for the order based on the latency. In certain embodiments, latency higher than a certain threshold may be the only available option for a user order because lower latency images may be regulated, or because another user may have exclusivity over them (for example if a user has ordered two days exclusivity—such as via an order that has a guarantee of being fulfilled) over a certain area of the world. Latency may be defined as being related to the time between collecting the data and delivering the data to the user, but latency may also be defined as being related to the time between placing the order, planning the order, and collecting the data (and optionally also until delivering the data to the user). For example, the user may indicate a certain desired level of latency related to the time between capture and delivery, because the user may want to receive geospatial information associated with data collected as recently as possible with respect to the moment of delivery, but may have a more relaxed requirement for the delivery time. For example, a user may want geospatial information associated with data collected within the past 2 hours before the delivery moment, so that it is "fresh" data used, for example, to geolocate moving objects, but she/he/they may allow the geospatial information to be delivered within the next 7 days. In this way, in the period between placing the order and the following 7 days, the geospatial information delivery system may determine when it will be possible to capture data and deliver the geospatial information to the user within 2 hours from capture. In another example, the user may indicate a certain desired level of latency related to the time between placing the order and receiving the geospatial information, optionally with less strict requirements for the freshness of the collected data. For example, the user may indicate a desire to receive data within the next 2 days, but with a relaxed requirement of when between now and the next 2 days the data associated with the geospatial information is collected. Latency can be reduced in different ways, which may result in an increased price. Some of the options with which latency can be reduced may include: using a specific ground station or communication channel to upload the order faster to the satellite, thereby resulting in a higher price, winning the capture opportunity if there are conflicts, such as by paying a higher price by placing the order with the guarantee of it being fulfilled, using a specific ground station (or communication channel) to download the geospatial information, thereby resulting in a higher price, or using extra processing power on board the satellite or on the ground to have collected data (such as images) processed and delivered faster. These options may be indicated as additional attributes in the order, or may be decided automatically by the geospatial information delivery system based on the user order indicating that latency should be below a certain level. Because the latency may affect the price, this determination may be performed by the mapping module and taken into account when computing the mapper value, or it may be computed by the pricing module after receiving the input coming from the mapping module and the forecast module.

If the user has indicated in an attribute a specific quality (threshold) for the geospatial information, this attribute may also have an effect on the price. High (lossy) compression makes better (less, cheaper) use of communication channels. If the user chooses a higher (lossy) compression rate in an attribute of the order, the bandwidth required from the communication channel to download the geospatial information may be shared to also download other data. In such a case, the price of the order may be lower than a case in which the user orders lower compression data. Alternatively or in addition to the user indicating the compression level in the order, the geospatial information delivery system may automatically and dynamically decide the compression level based on performing a content-based analysis of the collected data, such as performing content-based image analysis and determining that, based on the content, a certain compression level may be applied, and hence a certain price. This determination may be performed on the ground or on-board the satellite that collected the data, as described elsewhere within this Detailed Description. This determination may be performed by the mapping module and taken into account when computing the mapper value, or it may be computed by the pricing module after receiving the input coming from the mapping module and the forecast module.

Assigning a mapper value to each tile, and updating the mapper value of the tile(s) for which geospatial information is requested, is a manner of allowing the system to access data in a structured manner, and to process, in a structured, simple and fast manner, the requests from the users so as to assign priorities, to manage the request and system resources and to assign a price for the request. The mapper value may provide information that allows the geospatial information delivery system or imagery data delivery system to optimize the system resources and/or to maximize a value to be obtained by the user and/or by the geospatial information delivery system, based on the attributes of the order, and other pending user orders. This is because these mapper values of different tiles may then be used to prioritize the orders and target and/or task the satellite constellation so that the satellite constellation may be used in the most optimal manner and/or allowing to obtain the highest possible value, while satisfying user orders based on their needs. The output of the mapping module may include the updated mapper value 116-6 for at least one tile after taking into account the user order, and it may include updated values for multiple or all the tiles in the grid (heatmap). This can be seen in FIG. 3C.

As an example, for a certain area A (covering at least one tile) and for a certain week, there may be ten orders placed to be used for cartography, two orders for agriculture and one order for meteorology. For another area B (covering at least one tile), which may be 200 km away from area A, and for the same week, there may be ten orders placed for agriculture. A user may place an order for agriculture for area B. The mapping module may then determine the mapper value for each tile at least partially covered by the area, to see in which of the two areas the actual value is higher (for example, the total price expected to be paid for all the orders placed in area A may be higher than the total price expected to be paid for all the orders placed in area B). This is in order to allow the forecast module (which will be described later) to plan the operation of the satellite fleet (constellation) based on the values given by the mapping module for each of the areas A and B, as it may not be possible, or the operational cost may be higher than a threshold, to satisfy the orders in both areas due to the constellation capacity limitations which may not allow to maneuver to cover both areas within the requested time frame. In an alternative example, the geospatial information delivery system may decide that the area with a lower mapping value still is assigned a higher priority, based on contextual information about the general mission. This may happen for example when completing a remapping operation, even if the missing capture does not have the highest mapping value, is highly valuable due to the fact that a much bigger mapping is completed.

Having a fixed distribution of uniform or non-uniform areas into which the map (both the catalog and the heatmap) is divided, in such a way that each area is smaller than the area of a stripe of data collected by a satellite, allows to analyze, process, and provide geospatial information related to the collected data for smaller areas, which avoids analyzing and providing the users with unnecessary information about an entire stripe. A gridded distribution of tiles of non-uniform size may be defined for example by a finite element method (FEM), whereby the FEM subdivides a large system into smaller, simpler parts that are called finite elements. This is achieved by a particular space discretization in the space dimensions. A gridded distribution of tiles of uniform size may be defined following the military grid reference system (MGRS).

Having a fixed, such as a gridded, distribution of the areas into which the map (both the catalog and the heatmap) is divided, as opposed to having stripes or other non-uniform areas, allows an easier and more structured access and retrieval of the requested geospatial information, which at the same time can be queried more accurately according to parameters such as could cover, off-nadir angle, analytics or semantic analysis (number of cars, trucks, trees, or any object of interest). Having a combination of tiles smaller in area than stripes, and being of a uniform distribution, is especially beneficial for scenarios in which the map is to cover the whole Earth and is to be updated at frequent times, such as for a monthly world remap, weekly world remap, daily world remap, or the like.

The forecast module 120 may be configured to determine an estimation of the feasibility to fulfill an order placed by a user. The forecast module may be part of the planner or tasking subsystem, or may be a separate subsystem. The forecast module may receive as input the mapper value(s) from the mapping module 116, and the at least one attribute from the user order. Attributes from the user order which may be relevant for the forecast module may include the start and end dates, the frequency of data collection, the attribute indicating whether the user allows the geospatial information delivery system to perform a best effort to fulfill the order, but with the risk of the order not being fulfilled if other orders take precedence or relevance, or whether the user wants a guarantee that the order will be fulfilled (best-effort/lock-in attribute), and/or the percentage of cloud coverage or unobstructed area. The forecast module may also use information about data collection opportunities, and short and long term planning, and may also use the telemetry/operational data that is used for monitoring status/health of the one or more satellites and for use in decision making, also known as metadata. Based on this, the forecast module may determine how feasible it is to fulfill the user order. For example, the forecast module may determine the feasibility to fulfill the order based at least in part on the revenue obtained from providing to users geospatial information from that area in the past and/or on the effective cost for the satellite constellation system and geospatial information delivery system of having collected, processed and provided said geospatial information. This effective cost may also take into account the use of resources to determine which satellite(s) from the constellation are suitable for collecting the data associated with the geospatial information, such as capturing data, to steer the payloads of at least one satellite to point at the requested area, to process the captured data, etc.

The forecast module 120 may take into account the mapper value(s) generated by the mapping module 116, which may include the mapper values for all the tiles where there are orders placed. The mapper value(s) may be considered by the forecast module in order to assign priorities to the areas where the data is to be collected by the satellites. An area with a higher mapper value may have a higher priority than an area with a lower mapper value. The forecast module may also take into account the user order, and may perform a series of operations and simulations of the satellite constellation operations, taking into account priorities, maneuver restrictions, payload conflicts, power consumption, duty cycles, heat dissipation, and all other operative constraints on the satellite as an entity and its subsystems, or other operative constraints on the satellite fleet as a whole, and also taking into account the planned area to be mapped by each satellite at different times, to determine whether the user order can be fulfilled. The forecast module may also take into account the best effort or lock-in attribute to determine the feasibility of fulfilling the user order when the user selects the lock-in option. The forecast module may thus output an estimation of whether the order can be completed based on the future capacity of the satellite fleet, and may schedule the satellite constellation taking into account the order.

The pricing module 114 may be configured to determine the price for the geospatial information requested by the user. The price assigned by the pricing module may also include the value zero, if the geospatial information delivery system determines that the user can receive or access the geospatial information for free, at no cost.

If an order is placed with a start and end date in the past, the pricing module 114 may take as input the at least one attribute of the user order, and may assign a price based at least on the time past since the data associated with the geospatial information was acquired. The pricing module 114 may also take as input the mapper value(s) from the mapping module 116. The mapper value(s) have been generated or updated by the mapping module 116 taking into account at least one of the type of product indicated by the user in the order, the application, the area, the date, the percentage of cloud coverage, at least one attribute of the attributes requiring some kind of data processing which may include on board computing on the satellite, and the like.

For example, the older the data is, the lower the price may be. Therefore, the price may be dynamically assigned when the order is received, based on how long ago the data associated with the geospatial information was collected, in a descending order as the data is older, which may descend following a linear, logarithmic, exponential, or any other suitable function.

The price may also increase or decrease based on the application for which the geospatial information is to be used, the type of product, the percentage of cloud coverage, and the specific area (location and extension) for which the geospatial information is obtained. For example, depending on whether the user indicates a type of product or another, the pricing module may assign a different price to the requested geospatial information. For example, an order for a lower resolution image may have a lower price than an order for a higher resolution image, as the amount of data to be provided is also different. For another example, depending on whether the user indicates a type of application or another, the pricing module may also assign a different price, because for example the amount or quality of data to be provided for agricultural purposes may be different from the amount to be provided for infrastructure purposes.

If an order is placed with at least the end date in the future, the pricing module may receive as input the at least one attribute of the user order, the mapper value(s) generated by the mapping module 116 and the estimation output from the forecast module 120. The mapper value(s) already takes into account at least one of the application for which the geospatial information is to be used, the type of product, the percentage of cloud coverage, the specific area (location and extension) for which the geospatial information is obtained, at least one attribute of the attributes requiring some kind of data processing which may include on board computing on the satellite, and may take into account additional or alternative attributes. The assigned price for a tile of an order may be directly proportional to the mapper value for the tile, or it may even correspond to the mapper value, if there is only one order placed in the tile. The forecast module 120 may already take into account the start and end dates, the frequency of data collection and/or the percentage of cloud coverage, and/or the other orders placed for the same or different area and for the same or similar dates. Other attributes which may affect the price include, but are not limited to, the type of content, whether the user wants a specific latency, whether the user wants a specific quality, whether the user wants to view the geospatial information, process the geospatial information, and/or download the geospatial information, or the like.

The start and end dates of the order may affect the volume of MDUs of geospatial information delivered, which in turn affects the price. Indeed, if for example a certain area has many orders placed for a certain date, the price of a new order placed for the same area and date may be influenced by said orders i.e. by the higher demand of data over that area at that time. This is taken into account by the mapping module and by the forecast module. The frequency or recurrence controls the amount of MDUs delivered per unit of time, and therefore the amount of captures at least one satellite has to make in order to provide the geospatial information. Increasing or reducing recurrence affects the price of the order. This may be taken into account by the mapping module and/or by the forecast module.

The type of application for which the geospatial information is to be used may also affect the price. The area for which the geospatial information is to be provided may also affect the price. Because the number of orders placed for an area may increase, and this may change the price, in an exemplary embodiment, the orders are limited to not later than a certain point in the future, such as not further than three months in the future. In this way, the potential effect of more users placing more orders in the future for the same area is lower. In another exemplary embodiment, the orders for the future are not limited, and an estimation of the price is also done taking into account potential new orders placed in the future. As another example, an area which may be more difficult to reach, because it may require considerable maneuver of the satellite constellation, because of the path followed by the satellites' orbit, may result in a higher price than an area with easier access, as it requires more satellite constellation resources (this may be taken into account when assigning the mapper value by the mapping module). The location of the POI or the AOI for which the geospatial information is to be provided may also affect the price. For example, as explained elsewhere within the Detailed Description, depending on the location of the POI the information of more than one tile may be needed to provide the geospatial information requested in the order. Similarly, if more than one MDU per tile is required to fulfill the order, this might also increase the price. Hence, the selection of the AOI or POI may result in a higher price if a higher number of tiles and/or MDUs are needed to cover the AOI or POI. In some instances, the geospatial information delivery system may propose other POI or AOI to the user before confirming the order including different tile/MDU combinations to reduce the price, and/or to meet the attribute of the maximum price the user is willing to pay. This may be taken into account by the mapping module and/or by the forecast module, as seen above.

If the user has indicated the type of content of interest (such as crops, trucks, or the like), that may also have an impact on the price. When the order to be satisfied with this requirement includes imagery data to be captured in the future, in order to assign a price to the imagery data, an a priori estimation may be made of the expected content to be present in the requested images. This a priori estimation may be based on historical data from similar areas with similar types of attributes, or of the same area with other attributes, or the like. In addition, the specific content (feature or object) of interest may influence the price set to the geospatial information containing imagery data. For example, if a specific sensor needs to be activated such as a hyperspectral camera to capture the spectral signature of crops, higher resolution cameras to identify small objects, video cameras, thermal cameras to detect livestock, that may have an impact on the price. This attribute may be taken into account by the mapping module when assigning the mapper value, as seen above, by the forecast module when considering the payloads that need to be activated or how a satellite needs to be steered, and/or may be taken into account by the pricing module.

In addition, if the satellite performs the content-based image analysis, the satellite may automatically determine whether the image contains the attribute indicated by the user, and may autonomously decide whether to transmit the image so that it is provided to the user, or to discard it. This may also affect the price. In addition, the satellite may automatically decide that the content of the image is of a relevance or a priority higher than a threshold, and in such case autonomously decide to transmit (download) the image with highest priority. This may also affect the price. As seen above, this may be taken into account by the mapping module, or by the pricing module. If the user has indicated in an attribute a specific latency (threshold) for the geospatial information, this attribute may also have an effect on the price. As seen above, this may be taken into account by the mapping module or by the pricing module.

If the user has indicated in an attribute a specific quality (threshold) for the geospatial information, this attribute may also have an effect on the price. As seen above, this may be taken into account by the mapping module or by the pricing module.

The cloud coverage detected or expected at a certain area may also have an effect on the price, because this may require performing multiple passes over the certain area until the threshold for acceptable cloud coverage has been reached and the imagery data can be collected. It should be understood that instead of cloud coverage the user may specify an alternative obstruction that may interfere with the view of areas, objects or points of interest and, similarly to the cloud coverage, the obstruction coverage may also have an effect on the price. This attribute may have been taken into account by the mapping module and/or by the forecast module. Focusing the satellite resources on this operation also contributes to the cost of the provision of imagery data.

In addition, if an order is placed indicating that the user wants a guarantee that the order will be fulfilled, the pricing module may, based on a comparison of the mapper value(s) for the different tiles, determine the price the user will need to pay for the order to be fulfilled. Indeed, if with the purpose of fulfilling the current order, at least one of the other orders cannot be fulfilled, because it is not feasible from the point of view of the satellite resources, the price assigned to the current order should compensate for the losses caused by not fulfilling the at least one other order. The number of other orders placed in the system at the moment of placing a current order may have an effect on the price, because the more orders placed which may affect the current order, the higher the price will be that the user has to pay for the current order to be fulfilled.

In addition or alternatively, the attribute allowing the user to select an algorithm, such as an algorithm running on one of the satellites of the constellation, or running on the ground, with which to process the collected data or the requested geospatial information before receiving it by the user may also determine how and what type of geospatial information is provided. For example, the user may order to collect data in a specific area and time and to apply a specific algorithm to said collected data, and said algorithm is to be applied on a satellite, such as the satellite that has collected the data. In this case, the satellite may itself decide, based on the output of the algorithm, whether the geospatial information is transmitted (downloaded) to a ground station or is discarded by the satellite. Because transmission of information may be avoided, this may affect the price, to make it lower. On the other hand, because processing on board the satellite may be performed, this may increase the price.

In addition or alternatively, depending on the way in which the user wishes to interact with the requested geospatial information, the price may vary. For example, depending on whether the user wants to only view the geospatial information, process the geospatial information, or download the geospatial information, the price may vary, because also the amount of information which may be made available to the user may vary. Here, downloading the geospatial information may refer to downloading it from the geospatial information delivery system to the user premises or devices. However, downloading may also refer to downloading from the satellite that has collected the data to a ground station which, as seen above, may be performed by the satellite that collected the data autonomously.

In addition, depending on the type of product, the price may vary. For example, if the collected data is processed autonomously in the satellite, it may be required to activate a certain satellite payload, such as a gas detection payload for detecting methane or an imaging payload for collecting imagery data, steering the payloads of at least one satellite to point at the requested area, processing the captured data, switching on video capturing after performing content-based image analysis and having detected an object or feature of interest, and so forth, because the demand of satellite and/or constellation resources may vary.

The order and planning module 118 may take as input the price given by the pricing module 114 and confirm the order when receiving confirmation from the user that the price is accepted. When the user order is at least partially in the future, the order and planning module may also take as input the output from the forecast module 120, which has planned and prioritized the tasks for the satellite fleet with respect to all the other values given by other orders. Orders with a higher mapper value may have higher priorities for receiving the requested geospatial information. According to embodiments of the present disclosure, the order input by the user through the user interface module, with the at least one attribute, is both an order to search the geospatial information and to receive it. In this way, the user does not need to first input parameters for the search and then input or select parameters for placing the order; by entering the order with the attributes once, the geospatial information delivery system will perform the search and, if the user accepts, will automatically and immediately confirm the order. The geospatial information may be provided to the user in the form of one or more MDUs, which, as seen above, contain collected data and metadata associated with the data. For example, if the geospatial information contains imagery data, an MDU may include an image collected at a certain time for a certain tile, and the metadata may provide additional information related to the image. For example, if the geospatial information contains gas detection data, an MDU may include values related to the gas level detected, and the metadata may provide additional information. For example, the MDUs for gas detection may comprise images, analytics, concentration maps, leak heatmaps, or the like.

Having simple operations for each module reduces the processing power required to place an order after having determined the price for the order and/or having simulated the reprogramming of the satellite constellation to estimate the feasibility and planning of the tasks. Processing must be simple and fast, yet reliable. This is of utmost importance, because it also facilitates that the price and planning can be provided to the user in real time or almost real time.

In some instances, a user requiring specific satellite data may input an order (request) regarding an area of interest (AOI) or a point of interest (POI), or a particular type of AOI as a polygon on the surface of the Earth in a particular coordinate system. Associated with the AOI, the user selects and fills specific metadata to specify a Service Level Agreement (SLA). The SLA can include, for example, some or all of the following: monitoring frequency requirements (minimum frequency, maximum frequency, target frequency distribution); sensor types for acquisition (from available payloads, imaging and otherwise); sensor processing pipeline specifications (for radiometric correction, ortho-rectification, stitching, projection models, sensor models, atmospheric correction, geo-location, etc.); sensor analysis workflow (including raster and vector processing blocks, machine learning modules, intermediate storage procedures, etc.); data required on the ground (data types, results of sensor analysis workflow, and frequencies, or trigger conditions [for example, only download X if a certain parameter exceeds a threshold]); and storage requirements (min storage, max storage, cache-cleaning procedures, data phasing strategies). In some cases, a user may also specify a bidding price, such as a maximum price the customer is willing to pay for accomplishing the SLA.

In some cases, the user is given the ability to specify (or provide) programs, including machine learning or artificial intelligence networks or algorithms, to be uploaded to the satellite to be executed, or to be executed by connecting to the geospatial information delivery system through the API, and some of these programs may be executed on-demand. Examples of this type of service, for example, are to allow a user to train and upload their own machine learning algorithms, which can be configured to conduct image processing and analysis, and to only send data corresponding to areas or objects of interest that meet certain criteria as defined by the user. In this way, images (or desired data based upon image analysis) are selected and transmitted based upon customer criteria, and in some instances, the satellite owner never learns how the user is processing, analyzing, or selecting images.

An AOI (or POI) with an associated SLA may be referred to as a contract. Contracts generated from input from users or customers may be considered customer contracts. Other types of contracts may be generated automatically by prioritization algorithms from open-source data. For example, contracts may be automatically generated, such as by tracking changes in OpenStreetMaps (OSM) or other crowdsourced Geo-information databases; by processing real-time fees from social networks such as Twitter or other social network feeds; by monitoring geo-located news; or otherwise. As an example, in the case where a news source may be reporting on live events unfolding in a particular region, the satellite may receive from the ground or from other satellites information associated with the news report, and automatically generate a contract that includes an AOI and an SLA and task the satellite to detect gasses, transmit or receive RF signals, or capture image data, which may include video data, of the events unfolding in the geolocated AOL. Other contracts may be generated in the satellite as a result of data or image processing and onboard data or image analytics (e.g., as a result of the execution of other existing contracts).

Contracts may also be generated when the user accepts the geospatial information requested to the geospatial information delivery system, and said contracts may for example specify the attributes that the provided geospatial information includes, such as the application for which the geospatial information is to be used.

The satellite may establish a communications channel as it passes over a ground station. In some instances, an information exchange protocol may be executed where the satellite receives from the ground station an updated list of Contracts and the satellite sends to the ground station new Contracts that were created in orbit since the last contact. Optionally, the ground station may send the satellite updated vector and raster maps to support the SLAs in the Contracts in the updated list. For example the ground station may send a new vector map with changes to OSM near the AOIs. In some cases, the satellite may send to the ground station the status of its short-term planning, including its prioritized task list.

Example of Method

The examples below show how a user may express their selection criteria in the order. In the examples, the user is requesting any MSI L3 image (multispectral level 3) within Germany, captured either in the last or next 15 days (archive image or order for future captures), with at least a building higher than 50 meters. The pricing of the result will vary based on whether the image is in archive or captured, whether it is downloaded or just captured. It also depends on an analytics module (semantic analysis module) running on every image to detect buildings and compute their heights, which may also have an impact on the price. The two examples, one expressed in a domain specific query language and the other in a more general programming language, could be evaluated in the ground (for archive and future data) or in-orbit, as new images are captured. When in orbit, the user can decide to subscribe all results to a high priority communication channel, or do further processing on the selected results, and dynamically decide when to pay an extra for fast downloads, or when to save money on data that can be discarded.

```
SELECT mdu.MSI_L3.raster WHERE (mdu.locaion in WORLD.GERMANY) AND (order.date-
DAYS(15) < mdu.capture_date < order.date+DAYS(15)) AND (MDU.buildings.max_height_m > 50)
  or in python
  def select_MDU(order, MDU):
    if not(World.Germany.contains(mdu.location)):
      return None
    if not(order.date-days(15) < mdu.capture_date < order.date+days(15)):
      return None
    for building in mdu.buildings:
      if building.height_m > meters(50):
        return mdu.MSI_L3.raster
    return None
```

Figure 4:
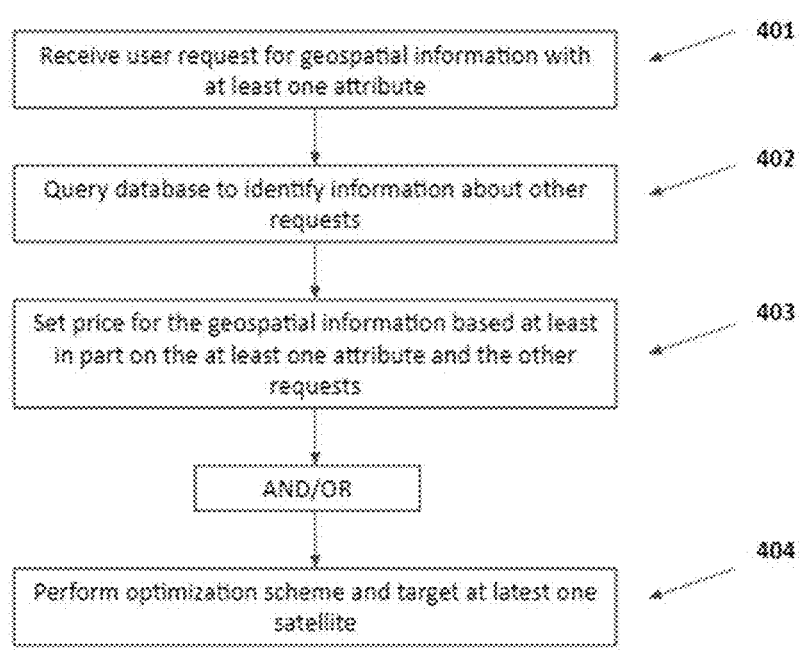
FIG. 4 is a flowchart of a process according to an exemplary embodiment of the present disclosure.

FIG. 4 is a flowchart 400 of a process according to an exemplary embodiment of the present disclosure.

The operations of this method are illustrated in individual blocks and summarized with reference to those blocks. This method is illustrated as logical flow graphs, each operation of which may represent a set of operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. In the context of hardware, the operations may be carried out in an integrated circuit, such as in an application specific integrated circuit (ASIC), a programmable logic device, such as a field programmable gate array (FPGA), graphical processing unit (GPU), tensor processing unit (TPU), or a software defined radio (SDR). Other examples of hardware may be used with the embodiments described herein and are contemplated herein as providing the features and benefits described. The order in which the operations are described is not intended to be construed as a limitation, and any number of the described operations can be combined in any order, separated into sub-operations, and/or performed in parallel to implement the process. Processes according to various embodiments of the present disclosure may include only some or all of the operations depicted in the logical flow graph. Moreover, the operations may be carried out by a single system, such as onboard a terrestrial vehicle, watercraft, spacecraft, aircraft, or ground station, or may be shared between multiple systems located with the software-defined communication device and onboard one or more vehicles or ground based systems.

In the exemplary embodiment of FIG. 4, the process starts in step 401 by receiving a user request (order) for geospatial information, such as imagery data, with at least one attribute. The process continues in step 402, by querying a database to identify information about other orders or requests received from the same or different users, with the same or different attributes. The database may correspond to at least one of the catalog and the heatmap as described above. Then, at least one of the following steps may take place, or both of them, in sequence, in reverse sequence or in parallel: in step 403, the process sets a price for the geospatial information, such as the imagery data, requested by the user based at least in part on the at least one attribute and the identified other requests. In step 404, the process performs an optimization scheme for determining whether the requested geospatial information can be provided to the user and the other user requests can be satisfied, and targeting or tasking at least one satellite (or sensor on board a manned or unmanned aerial or space vehicle) configured to collect the imagery data based on the determination. The step of setting a price for the geospatial information may be performed as explained elsewhere in this Detailed Description, such as by the pricing module or other modules or subsystems taking into account the different elements and modules (including the mapper value) described in this Detailed Description. Similarly, the step of performing the optimization algorithm scheme for determining whether the requested geospatial information can be provided to the user and targeting at least one satellite or sensor may be performed as explained elsewhere in this Detailed Description, such as by the forecast module taking into account the different elements and modules (including the mapper value) as described in this Detailed Description.

Figure 5:
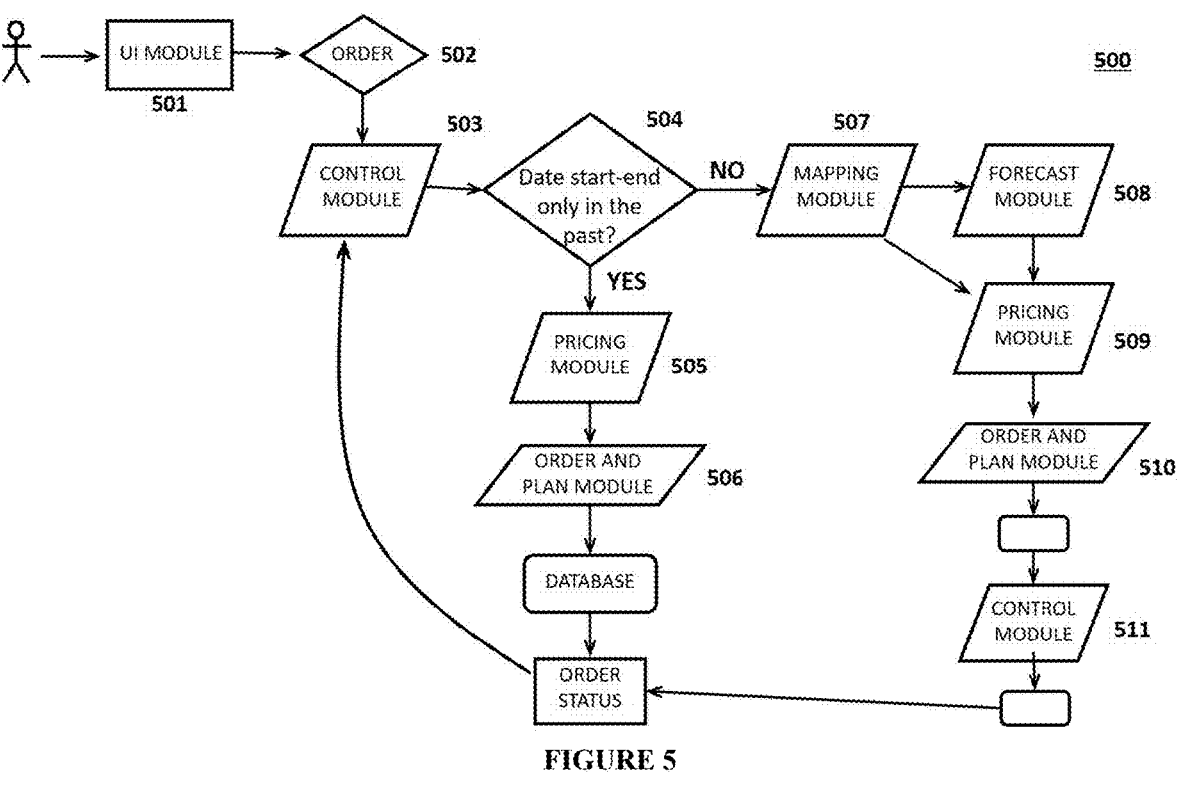
FIG. 5 is a flowchart of a process according to an exemplary embodiment of the present disclosure.

FIG. 5 is a flowchart of a process according to an exemplary embodiment of the present disclosure. In the exemplary embodiment of FIG. 5, in step 501 the user may explore the options available through the user interface module, and may place an order in step 502 with at least one attribute. The control module may retrieve the order in step 503 with the at least one attribute, and may determine in step 504 whether the order is for geospatial information or metadata, with a start and end date in the past or with at least the end date in the future. While this example describes imagery data, it should be understood that the order may be for any type of geospatial information derived from data obtained from a sensor on board a satellite such as RF data or gas detection data, as well as for analysis results obtained by analyzing the data or the metadata.

If the start date and end date are both in the past (answer YES), the process may move to the pricing module, which may estimate a price for the requested imagery data in step 505 based on how long ago said imagery data was collected, and/or on the extension of the surface area requested, and/or based on the application the imagery data is to be used for, and/or based on the type of product the imagery data is going to constitute, as seen above. As an intermediate step, the process may move first to the mapping module, which may generate or update mapper value(s) for the tiles corresponding to the area selected by the user. Based on the mapper value(s), as seen above, the pricing module may estimate the price. The order and planning module may then retrieve the imagery data from a database or catalog in step 506, and may confirm the order if the user agrees to the price. The geospatial information, such as imagery data, may then be provided to the user, in the form of at least one MDU as seen above, comprising data and metadata.

If at least the end date is in the future (answer NO), the process moves to the mapping module, which may then, in step 507 and based at least in part on the at least one attribute included in the user order, and on other user orders placed for the same area, assign or update mapper values to at least the areas (tiles) of the heatmap present in the user order, or it may assign mapper values to multiple or all the areas of the heatmap (which may be a grid). The updated heatmap or grid with the assigned mapper values may then be input to the forecast module which may then estimate, based also on the at least one attribute, and on the mapper values provided by the mapping module for the different areas of the heatmap, which indicate the values assigned to said different areas, in step 508, whether it is feasible to fulfill the user order, such as by performing a simulation of the satellite constellation operation, including determining paths of the satellites, determine whether the cameras of at least one satellite can be targeted to the requested area at the requested time, and the like. If the user order cannot be fulfilled, the process may be stopped and the user may be informed. If the user order is expected to be fulfilled, or at least there is a probability of success/completion higher than a threshold, the process moves to the pricing module. The pricing module may take as input the updated heatmap or grid with the assigned mapper values and the estimation given by the forecaster module, and based on this it may set a price for the requested data in step 509. The order and planning module may then take the output of the forecast module, which has planned the tasking of the satellite constellation to fulfill the request, and may in step 510 inform the user of the price plan, including time of delivery of the data, and whether all the attributes of the order can be fulfilled. If the user (or the software agent, if present) accepts the price and conditions, the order and planning module may confirm the order, and the control module may control, in step 511, the geospatial information delivery system to collect the data associated with the geospatial information at the planned times by the planned satellites and process it in the planned manner and provide it to the user, such as in the form of MDUs as seen above.

Figure 6:
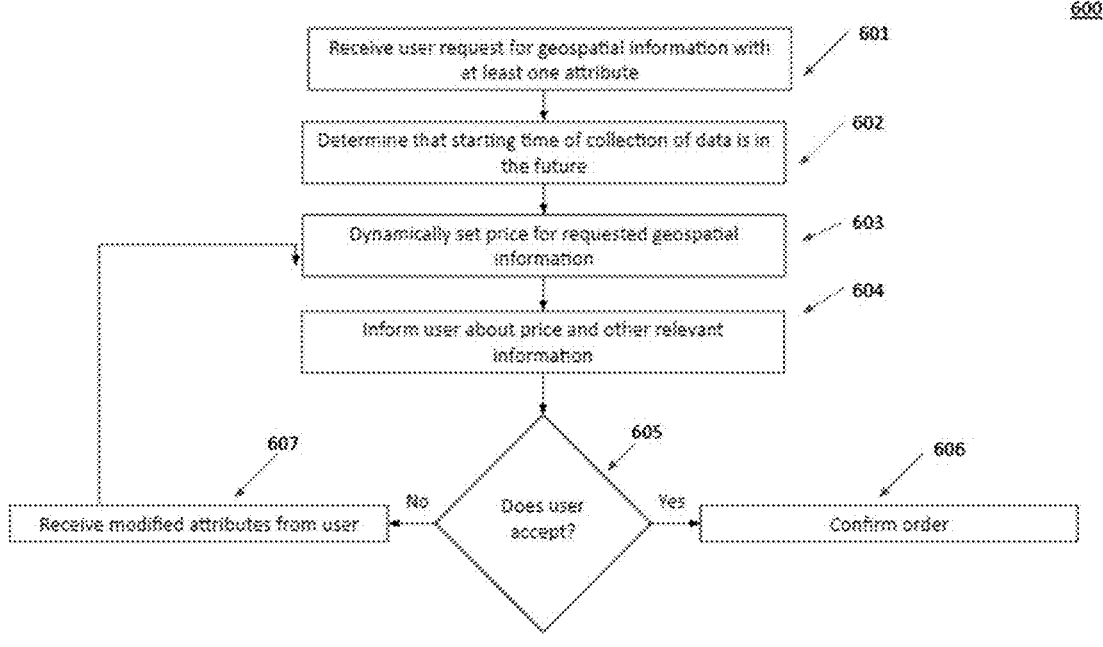
FIG. 6 is a flowchart of a process according to an exemplary embodiment of the present disclosure.

FIG. 6 is a flowchart of a process according to an exemplary embodiment of the present disclosure. In the embodiment of FIG. 6, in step 601 a user explores the user interface and the options for attributes, and places an order or request through the user interface of the geospatial information delivery system. A user request for geospatial information with at least one attribute is thus requested. The geospatial information delivery system detects the starting date of collection of the order. In the exemplary embodiment of FIG. 6, it determines in step 602 that the starting date of collection is in the future.

The geospatial information delivery system then may dynamically set the price for the requested geospatial information, such as imagery data, in step 603. This may be done by the mapping module, the forecast module and the pricing module described above, in order to take into account not only the at least one attribute of the user order, but also all other orders already placed in the heat map or map grid and their attributes.

The geospatial information delivery system may then inform the user (or the software agent, if present) in step 604 about the price, and the user may be able to see other relevant information, such as information related to when the order is expected to be delivered. The user may also be able to see at least some of the other orders placed for the same area. The user may also be able to see the prices for other areas. In step 605 it is determined whether the user accepts the price and other information such as the delivery date information. If the user does not agree (answer NO), the user may be able to further modify, in step 607, the attributes of the order, and the process may go back to step 603, thereby recalculating the price and other relevant information. As a result, different prices and/or delivery dates may be shown to the user in real time. This operation may be repeated as many times as needed/desired. When the user has accepted the price and other relevant information such as the delivery time (answer YES), the order is finally confirmed in step 606.

When the user further modifies or tweaks the attributes in step 607, not only is the price dynamic, but the available areas (tiles) for the selection may also be changed. As an example, any combination of date, cloud coverage, frequency, products and application might yield different tiles available for order over a same or similar area of interest. Yet, in some instances, the geospatial information delivery system may, based at least in part on the forecast module, propose a combination of attributes to the user in order to modify the price. For example, to meet the requirement of the attribute given by the user indicating a maximum price the user is willing to pay, the geospatial information delivery system may propose to the user to select another value for cloud coverage based on previous information about the historic cloud coverage of the area of interest, or may propose to select areas closer to the originally selected area of interest based on the planning of the satellite fleet so that the price would be reduced due to the increased data collection opportunities, or may propose another application based on payload availability or payload pointing precision and the price may be reduced or increase depending on the payload, and so forth. In addition or alternatively, in some instances, when the user gives a maximum price, the geospatial information delivery system may propose or choose the lowest price that fulfills the user order with its attributes. These proposals may be alternatively made by the agent, if present, so that the geospatial information delivery system modifies the price or product offered to the user. For example, in a situation in which there is conflict of resources, the geospatial information delivery system may provide the geospatial information to the user using a low latency communication channel, but may not increase the price, because there is no other use at that moment for the low latency communication channel. Therefore, in some instances, among all the options that meet the attributes of the order, the geospatial information delivery system may assign the price according to different criteria, which may include the lowest price within the price range given by the user, the highest price payable by the user so as to maximize profit, an average price between the minimum and maximum payable by the user, or any other suitable criteria.

When the user places an order in the future, the user may be able to see, among the information shown to him/her/them through the user interface module, the capacity of the constellation and the areas that are of high demand, which will tend to be more expensive as there will already be orders placed on those tiles. Nonetheless, this gives the possibility to the user to decide whether to pay a premium for a future order or to wait a certain period, such as 48 hours, to place the order, which may already be available as a past order in a database. This allows for transparent and affordable operations.

The dynamism on price in the present disclosure may always be revealed to the user while creating an order. This is revolutionary by itself, as in the art the price is either placed based on commercial relations (personal quotes) or on price per km2. The user is in this manner allowed to adjust the orders to his/her/their needs, not having to receive unnecessary data, and allows the satellite data delivery system to optimize the resources to be used, and to steer the constellation to the most resource efficient areas, while allowing the user to achieve an acceptable amount of delivery data and delivery times.

Figure 7:
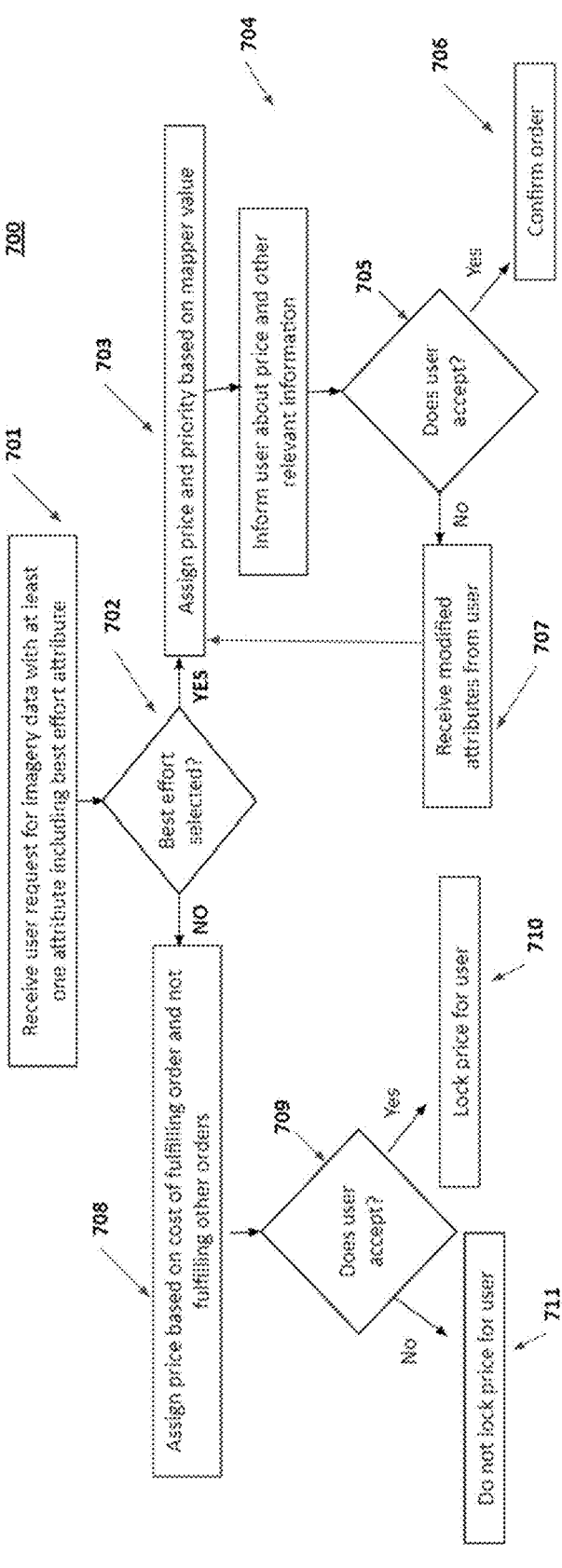
FIG. 7 is a flowchart of a process according to an exemplary embodiment of the present disclosure.

According to embodiments, a user may also indicate as attribute whether the user allows the geospatial information delivery system to perform a best effort to fulfill the order, but with the risk of the order not being fulfilled if other orders take precedence, or whether the user wants a guarantee that the order will be fulfilled (best-effort/lock-in-attribute). This is depicted in FIG. 7, which shows a flowchart of a process according to an exemplary embodiment of the present disclosure. The process may start in a similar manner as FIG. 6. However, in the user request or order of step 701, the user also includes a best effort attribute. The geospatial information delivery system (such as the control module), determines in step 702 whether best effort is selected or not. If the user selects the best effort option, the system may try to fulfill the user request or order, and may give in 703 a price and a priority to the request based on the mapper value given by the mapping module. As indicated in FIG. 6, the user may be shown in step 704 the price, and also the priority and/or information related to other orders that may be before the user's order. If the user accepts the order in 705, the system confirms the order in 706. As in FIG. 6, the user may modify attributes in 707 to change the price and/or priority, and/or the system may propose to modify attributes or may propose a combination of attributes. If however the user does not select the best effort option but the guarantee option, this may mean that the user is not willing to risk not being provided with the requested (imagery) data at the requested time. This may be because the user wants/needs to receive data from a specific location at a specific moment, because for example there is a volcano erupting or a flood affecting certain areas, and the user wants to see what happens in those areas as soon as possible. In this scenario, the price will not only be based on the mapper value. The order and planning module may perform in step 708 an opportunity cost estimation, and may compute what the cost would be of fulfilling the user's order with the highest priority, thereby giving lower priority and potentially losing other orders, and re-targeting and/o re-tasking the satellite constellation to fulfill the user's order. This may provide as a result a value which may be associated with the price the user would need to pay for the system to be rearranged so as to fulfill the user's request. This price may be obtained by taking into account the sum of the prices for the other orders which will not be fulfilled if the current user order is fulfilled, so the price for the current user order may be such that it compensates for the other user orders. If the user accepts in step 709 the price, the order is locked in step 710 and the user will be given priority for this order. As a consequence, other orders which did not use the option of the guarantee but the option of best effort, or which did not accept a price, may not get their orders completed.

If the user does not accept the price, the price will not be locked for the user in step 711, the process may go back to step 701 so that the user may start again, or the process may stop.

In another exemplary embodiment, which can be combined with the previous embodiments, the geospatial information delivery system may receive an order or request from the user for imagery data or other geospatial information with at least one attribute, and the request may also indicate the maximum price the user is willing to pay for the requested imagery data. Based on the indicated maximum price, the at least one attribute indicated in the request, and other placed user orders or requests, the geospatial information delivery system may optimize to which users the geospatial information can be provided, and with which attributes. In one example, a user requests imagery data of a specific area of interest, to be used for cartographical purposes, at a certain moment, and there are other requests for imagery data of other areas of interest, to be used for the same or different purposes, at the same moment or within a time frame that does not allow to maneuver the satellite constellation to capture imagery data for both requests at the required time. In this conflicting scenario, and also taking into account the maximum price the users indicated, the system (such as the mapping module, the forecast module, the pricing module and the order and planning module, together with the control module, as seen above) may determine the most optimal use of the satellite constellation resources, and based on that may decide to redirect the satellite constellation so as to capture the imagery data for both requests, or may decide to fulfill one request and not the other.

For example, if the system (the mapping module, the forecast module, the pricing module and the order and planning module, together with the control module) decides that the orders for a certain area can be satisfied but the orders for another area, which is the area interest of the current user order, cannot be satisfied with the current attributes, because for example it is not within the scope of the swath corresponding to the Earth mapping at the required times, it may inform the user.

The system may in addition or alternatively compute the opportunity cost as explained in FIG. 7 and calculate whether it would be possible to satisfy the orders for the area of the user order, and not satisfy the orders for the other certain area, and what the cost of that operation would be. The system may thus determine a price the current user(s) would need to pay for his/her/their orders to be satisfied, taking into account the potential additional maneuvering of the satellite fleet, and the loss being caused by not satisfying the requests of the other area. This is a dynamic price because it depends on several factors, such as on the other orders placed in other areas.

By operating in this manner, the satellite constellation resources may be optimized since the most targeted and customized imagery data is provided to the clients while making the most efficient use of the capability limitations of the satellite constellation system. The user orders can be managed to find a trade off between fulfilling the user requests at a high operational cost for retasking the satellite fleet and not fulfilling the user requests because of limited resource capability. A tradeoff between effective operational cost and the price given to the (imagery) data allows to find the balance to satisfy the users' needs within the limits of the satellite constellation system capabilities.

It is to be appreciated that embodiments of the methods and apparatuses discussed herein are not limited in application to the details of construction and the arrangement of components set forth in the preceding description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B:", "one or more of A and B:", and "A and/or B" are each intended to mean "A alone, B alone, or A and B together." A similar interpretation is also intended for lists including three or more items. For example, the phrases "at least one of A, B, and C:", "one or more of A, B, and C:" and "A, B, and/or C" are each intended to mean "A alone, B alone, C alone, A and B together, A and C together, B and C together, or A and B and C together." In addition, use of the term "based on" above and in the claims is intended to mean "based at least in part on", such that an unrecited feature or element is also permissible.

CONCLUSION

The subject matter described herein can be embodied in systems, apparatus, methods, and/or articles depending on the desired configuration. Although the disclosure uses language that is specific to structural features and/or methodological acts, the invention is not limited to the specific features or acts described. Rather, the specific features and acts are disclosed as illustrative forms of implementing the subject matter described herein. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method performed by a geospatial information delivery system for managing user requests for geospatial information, comprising the steps of:

a. receiving, from a user, a request for geospatial information, wherein the request comprises at least one attribute related to the requested geospatial information, wherein the at least one attribute includes information related to a content of interest in the geospatial information;

b. querying a database to identify information about other requests received from the same or different users, with the same or different attributes;

c. determining a mapper value for the request for geospatial information based at least in part on a weight assigned to the at least one attribute and based at least in part on the information related to the content of interest, wherein the mapper value represents a level of importance or worth of the geospatial information and allows to assign priorities and price to the orders for geospatial information and allows to plan and task a satellite constellation;

d. performing an optimization scheme for determining whether the requested geospatial information can be provided to the user and the other requests can be fulfilled;

e. updating, based at least in part on the determination, the mapper value;

f. dynamically setting a price for the geospatial information requested by the user, based at least in part on the mapper value;

g. providing information related to the request to the user, the information including at least one of the price and a delivery condition;

h. receiving, from the user, a user input including an order confirmation, an order modification, or an order cancellation; and i. determining, based at least in part on the user input and the determination, at least one of providing the requested geospatial information to the user, assigning at least one task to the satellite constellation to collect data associated with the geospatial information, and repeating steps a) to h) until the user input includes an order confirmation or an order cancellation;

wherein the steps further comprise performing a content-based analysis in the data collected by the satellite constellation to determine whether the collected data comprises the information related to the content of interest;

wherein the content-based analysis in the collected data is based at least in part on the execution of a machine learning algorithm, machine vision algorithm, or artificial intelligence algorithm.

2. The method according to claim 1, wherein the geospatial information comprises information associated with or derived from at least one of imagery data, radar data, lidar data, radiofrequency data, and data related to gas or other substance detection.

3. The method according to claim 1, wherein the at least one attribute further includes at least one of: a starting date of collecting the data, an end date of collecting the data, an area of interest, a target application for the geospatial information, a frequency of collection of the data associated with the geospatial information, a type of geospatial information, an acceptable threshold level for cloud coverage in the collected data, and a maximum price for the geospatial information.

4. The method according to claim 1, wherein performing the optimization scheme comprises at least one of determining a path or schedule that at least one satellite of the satellite constellation is to follow, determining whether the at least one satellite is to pass over an at least one area of interest, and determining if and how the at least one satellite needs to change a pointing direction.

5. The method according to claim 1, wherein performing the optimization scheme comprises performing a simulation of the operation of the satellite constellation, and determining resources needed for steering, tasking or reprogramming at least one satellite of the satellite constellation in order to collect the data associated with the geospatial information requested by the user with the at least one attribute.

6. The method according to claim 1, wherein the at least one attribute further includes an indication to download the geospatial information from at least one satellite of the satellite constellation if the information related to the content of interest is present in the collected data, and wherein the method further comprises, after performing the content-based analysis, autonomously determining, by the geospatial information delivery system, whether to download the geospatial information based on the presence of the information related to the content of interest.

7. The method according to claim 1, wherein the at least one attribute further includes information indicating that at least one algorithm selected by the geospatial information delivery system be used to process the geospatial information before providing the geospatial information to the user, and/or information selecting a specific algorithm to process the geospatial information; and wherein the at least one algorithm is executed on board at least one satellite of the satellite constellation.

8. The method according to claim 7, wherein the at least one satellite autonomously determines whether to provide the geospatial information to the user based on the result of processing the geospatial information with the at least one algorithm.

9. The method according to claim 1, wherein the optimization scheme is performed in order to satisfy at least one request that requires the most cost-efficient use of resources and/or that provides a highest value; and wherein the value is determined based at least in part on weight assigned to the at least one attribute of the user request.

10. The method according to claim 1, wherein the database comprises a heatmap of the Earth, divided into tiles of the same or different dimensions, wherein each tile provides information about the other requests received from the same or different users, and/or information associated with geospatial information collected for an area corresponding to said each tile in the past; and wherein each tile is associated with the mapper value, wherein for determining whether the requested geospatial information can be provided to the user, the method comprises assigning or updating the mapper value of at least one tile.

11. The method according to claim 1, wherein the at least one attribute includes information about whether the user allows the system to perform a best effort to fulfill the request, or whether the user requires a guarantee that the request will be fulfilled, wherein if the user requires the guarantee that the request will be fulfilled, the method comprises fixing the request, thereby setting the price and/or assigning the at least one task to the satellite constellation so as to fulfill the request; and wherein setting the price and/or assigning the at least one task to the satellite constellation so as to fulfill the request is based on performing an optimization operation to determine an operational cost and/or an expected value or revenue of fulfilling the user request while not fulfilling other requests in areas different from the area of interest.

12. The method according to claim 1, wherein at least one satellite of the satellite constellation comprises at least one sensor, and wherein the at least one satellite of the satellite constellation is configured to communicate with other satellites of the satellite constellation while in orbit and/or with at least one ground station.

13. The method according to claim 1, wherein the mapper value corresponds to a price of the requested geospatial information, or a combination of prices of the requested geospatial information and other requests.

14. A geospatial information delivery system comprising:
at least one processor; and
computer-readable media coupled to the at least one processor, the computer-readable media including one or more modules that are executable by the at least one processor to:

a. receive, from a user, a request for geospatial information, wherein the request comprises at least one attribute related to the geospatial information, wherein the at least one attribute includes information related to a content of interest in the geospatial information;

b. query a database to identify information about other requests received from the same or different users, with the same or different attributes;

c. determine a mapper value for the request for geospatial information based at least in part on a weight assigned to the at least one attribute and based at least in part on the information related to the content of interest, wherein the mapper value represents a level of importance or worth of the geospatial information and allows to assign priorities and price to the orders for geospatial information and allows to plan and task a satellite constellation;

d. perform an optimization scheme for determining whether the requested geospatial information can be provided to the user and the other requests can be fulfilled;

e. update, based at least in part on the determination, the mapper value;

f. dynamically set a price for the geospatial information requested by the user, based at least in part on the mapper value;

g. provide information related to the request to the user, the information including at least one of the price and a delivery condition;

h. receive, from the user, a user input including an order confirmation, an order modification, or an order cancellation; and i. determine, based at least in part on the user input and the determination, at least one of providing the requested geospatial information to the user, assigning at least one task to the satellite constellation to collect data associated with the geospatial information, and repeating steps a) to h) until the user input includes an order confirmation or an order cancellation, wherein the one or more modules are further executable to perform a content-based analysis in the data collected by the satellite constellation to determine whether the collected data comprises the information related to the content of interest;

wherein the content-based analysis in the collected data is based at least in part on the execution of a machine learning algorithm, machine vision algorithm, or artificial intelligence algorithm.

15. The system according to claim 14, wherein the satellite constellation further comprises at least one manned or unmanned space vehicle, wherein the at least one manned or unmanned space vehicle is further configured to transmit the geospatial information and/or the collected data associated with the geospatial information to the processor.

16. The system according to claim 15, wherein the one or more modules are further executable by the at least one processor to perform a simulation of the operation of the at least one manned or unmanned space vehicle, and determine the resources needed for steering, tasking or reprogramming the at least one manned or unmanned space vehicle in order to collect the data associated with the geospatial information requested by the user with the at least one attribute.

17. The system according to claim 14, wherein the at least one processor is on-board at least one manned or unmanned space vehicle and is further configured to perform a content-based analysis in the collected data to determine whether the collected data comprises the information related to the content of interest, wherein the content-based analysis in the collected data is based at least in part on the execution of the machine learning algorithm, machine vision algorithm, or artificial intelligence algorithm.

18. A computer-implemented method performed by a geospatial information delivery system for managing user requests for geospatial information, comprising the steps of:

a. receiving, from a user, a request for geospatial information, wherein the request comprises at least one attribute related to the requested geospatial information, wherein the at least one attribute includes information related to a content of interest in the geospatial information;

b. querying a database to identify information about other requests received from the same or different users, with the same or different attributes;

c. performing, before or after the user selects the at least one attribute, a content-based analysis in the geospatial information included in the database, wherein the content-based analysis is based at least in part on the execution of a machine learning algorithm, machine vision algorithm, or artificial intelligence algorithm;

d. determining whether the database includes the requested geospatial information including the information related to the content of interest;

e. determining a mapper value for the request for geospatial information based at least in part on a weight assigned to the information related to the content of interest and based at least in part on the information related to the content of interest, wherein the mapper value represents a level of importance or worth of the geospatial information and allows to assign priorities and price to the orders for geospatial information and allows to plan and task a satellite constellation;

f. performing an optimization scheme for determining whether the requested geospatial information can be provided to the user and the other requests can be fulfilled;

g. updating, based at least in part on the determination, the mapper value;

h. dynamically setting a price for the geospatial information requested by the user, based at least in part on the mapper value;

i. providing information related to the request to the user, the information including at least one of the price and a delivery condition;

j. receiving, from the user, a user input including an order confirmation, an order modification, or an order cancellation; and k. determining, based at least in part on the user input and the determination, at least one of providing the requested geospatial information to the user, assigning at least one task to the satellite constellation to collect data associated with the geospatial information; and l. repeating steps a) to h) until the user input includes an order confirmation or an order cancellation.

\* \* \* \* \*